United States Patent [19]

Galbraith et al.

[11] Patent Number: 5,537,567
[45] Date of Patent: Jul. 16, 1996

[54] PARITY BLOCK CONFIGURATION IN AN ARRAY OF STORAGE DEVICES

[75] Inventors: Robert E. Galbraith; Joseph T. Writz, both of Rochester, Minn.

[73] Assignee: International Business Machines Corporation, Armonk, N.Y.

[21] Appl. No.: 212,613

[22] Filed: Mar. 14, 1994

[51] Int. Cl.$^6$ ............................ G06F 11/14; G11C 29/00
[52] U.S. Cl. ........................................ 395/441; 395/182.04
[58] Field of Search .................................. 395/182.04, 441

[56] References Cited

U.S. PATENT DOCUMENTS

| | | | |
|---|---|---|---|
| 4,761,785 | 8/1988 | Clark et al. | 371/2.2 |
| 5,088,081 | 2/1992 | Farr | 369/54 |
| 5,130,992 | 7/1992 | Frey, Jr. et al. | 371/40.1 |
| 5,166,939 | 11/1992 | Jaffe et al. | 371/40.1 |
| 5,208,813 | 5/1993 | Stallmo | 395/182.05 |
| 5,258,984 | 11/1993 | Menon et al. | 395/182.05 |

FOREIGN PATENT DOCUMENTS

| | | |
|---|---|---|
| 0469924 | 2/1992 | European Pat. Off. . |
| 0499365 | 8/1992 | European Pat. Off. . |

OTHER PUBLICATIONS

IBM Technical Disclosure Bulletin, vol. 32, No. 6B, Nov. 1989, pp. 48–52, entitled "Distributed Check–Sum Approach for Clustered Disk Drives" by J. E. Donaldson et al.

PACSTOR, Incorporated, 983–b University Avenue, Los Gatos, California 95030 "PACSTOR Fault Tolerance".

Computer Science Division (EECS), University of California, Berkeley, California 94720, Report No. UCB/CSD 87/391 dated Dec. 1987 entitled "A Case for Redundant Arrays of Inexpensive Disks (RAID)" by David A. Patterson, Garth Gibson, and Randy H. Katz.

*Primary Examiner*—David L. Robertson
*Attorney, Agent, or Firm*—Roy W. Truelson; Richard E. Billion

[57] ABSTRACT

In a redundant array of disk storage units which independently accesses data blocks on different units and which uses parity blocks for data protection, parity blocks are confined to specific address ranges of each respective disk unit (rows of the array), each row containing multiple parity blocks. Each parity block represents the exclusive-OR of a stripe of data blocks located on a diagonal of the array. Where data accesses exhibit locality of reference in certain rows, this arrangement distributes the burden of updating parity more equally than a conventional RAID level 5. Additionally, because a "row" corresponds to a particular annular region of a disk surface on each respective disk unit, parity blocks can be located at optimal logical addresses or physical regions of the disk surface to simplify address translation and/or further improve performance.

24 Claims, 16 Drawing Sheets

DATA/PARITY DISK DRIVES

800

| 801 | 802 | 803 | 804 | Row Number |
|---|---|---|---|---|
| 0001 | 0002 | 0003 | 0000 | 0 |
| 0012 | 0013 | 0010 | 0011 | 1 |
| 0023 | 0020 | 0021 | 0022 | 2 |
| 003X | 003X | 003X | 003X | 3 |
| 0041 | 0042 | 0043 | 0040 | 4 |
| 0052 | 0053 | 0050 | 0051 | 5 |
| 0063 | 0060 | 0061 | 0062 | 6 |
| 007X | 007X | 007X | 007X | 7 |
| . | . | . | . | . |

| 0002 | 0003 | 0000 | 0001 | 0 |
|---|---|---|---|---|
| 0013 | 0010 | 0011 | 0012 | 1 |
| 002X | 002X | 002X | 002X | 2 |
| 0031 | 0032 | 0033 | 0030 | 3 |
| 0042 | 0043 | 0040 | 0041 | 4 |
| 0053 | 0050 | 0051 | 0052 | 5 |
| 006X | 006X | 006X | 006X | 6 |
| 0071 | 0072 | 0073 | 0070 | 7 |
| . | . | . | . | . |

| 0000 | 0001 | 0002 | 0003 | | 0 |
|---|---|---|---|---|---|
| 0010 | 0011 | 0012 | 0013 | | 1 |
| 0020 | 0021 | 0022 | 0023 | P | 2 |
| 0030 | 0031 | 0032 | 0033 | A | 3 |
| 0040 | 0041 | 0042 | 0043 | R | 4 |
| 0050 | 0051 | 0052 | 0053 | I | 5 |
| 0060 | 0061 | 0062 | 0063 | T | 6 |
| 0070 | 0071 | 0072 | 0073 | Y | 7 |
| . | . | . | . | | . |
| SSS0 | SSS1 | SSS2 | SSS3 | | SSS |

DATA/PARITY DISK DRIVES

| 901 | 902 | 903 | 904 | 905 | 906 | 907 | 908 | Row Number |
|---|---|---|---|---|---|---|---|---|
| 0001 | 0002 | 0003 | 0004 | 0005 | 0006 | 0007 | 0000 | 0 |
| 0012 | 0013 | 0014 | 0015 | 0016 | 0017 | 0010 | 0011 | 1 |
| 0023 | 0024 | 0025 | 0026 | 0027 | 0020 | 0021 | 0022 | 2 |
| 0034 | 0035 | 0036 | 0037 | 0030 | 0031 | 0032 | 0033 | 3 |
| 0045 | 0046 | 0047 | 0040 | 0041 | 0042 | 0043 | 0044 | 4 |
| 0056 | 0057 | 0050 | 0051 | 0052 | 0053 | 0054 | 0055 | 5 |
| 0067 | 0060 | 0061 | 0062 | 0063 | 0064 | 0065 | 0066 | 6 |
| 007X | 007X | 007X | 007X | 007X | 007X | 007X | 007X | 7 |
| . | . | . | . | . | . | . | . | . |

| 0002 | 0003 | 0004 | 0005 | 0006 | 0007 | 0000 | 0001 | 0 |
|---|---|---|---|---|---|---|---|---|
| 0013 | 0014 | 0015 | 0016 | 0017 | 0010 | 0011 | 0012 | 1 |
| 0024 | 0025 | 0026 | 0027 | 0020 | 0021 | 0022 | 0023 | 2 |
| 0035 | 0036 | 0037 | 0030 | 0031 | 0032 | 0033 | 0034 | 3 |
| 0046 | 0047 | 0040 | 0041 | 0042 | 0043 | 0044 | 0045 | 4 |
| 0057 | 0050 | 0051 | 0052 | 0053 | 0054 | 0055 | 0056 | 5 |
| 006X | 006X | 006X | 006X | 006X | 006X | 006X | 006X | 6 |
| 0071 | 0072 | 0073 | 0074 | 0075 | 0076 | 0077 | 0070 | 7 |
| . | . | . | . | . | . | . | . | . |

| 0000 | 0001 | 0002 | 0003 | 0004 | 0005 | 0006 | 0007 | 0 |
|---|---|---|---|---|---|---|---|---|
| 0010 | 0011 | 0012 | 0013 | 0014 | 0015 | 0016 | 0017 | 1 |
| 0020 | 0021 | 0022 | 0023 | 0024 | 0025 | 0026 | 0027 | P 2 |
| 0030 | 0031 | 0032 | 0033 | 0034 | 0035 | 0036 | 0037 | A 3 |
| 0040 | 0041 | 0042 | 0043 | 0044 | 0045 | 0046 | 0047 | R 4 |
| 0050 | 0051 | 0052 | 0053 | 0054 | 0055 | 0056 | 0057 | I 5 |
| 0060 | 0061 | 0062 | 0063 | 0064 | 0065 | 0066 | 0067 | T 6 |
| 0070 | 0071 | 0072 | 0073 | 0074 | 0075 | 0076 | 0077 | Y 7 |
| . | . | . | . | . | . | . | . | . |
| SSS0 | SSS1 | SSS2 | SSS3 | SSS4 | SSS5 | SSS6 | SSS7 | SSS |

FIG. 9A

PARITY BLOCK CONFIGURATION IN AN ARRAY OF STORAGE DEVICES

FIELD OF THE INVENTION

The present invention relates to computer data storage apparatus, and in particular to arrays of direct access storage devices commonly known as "RAIDs."

BACKGROUND OF THE INVENTION

The extensive data storage needs of modern computer systems require large capacity mass data storage devices. A common storage device is the magnetic disk drive, a complex piece of machinery containing many parts which are susceptible to failure. A typical computer system will contain several such units. The failure of a single storage unit can be a very disruptive event for the system. Many systems are unable to operate until the defective unit is repaired or replaced, and the lost data restored.

As computer systems have become larger, faster, and more reliable, there has been a corresponding increase in need for storage capacity, speed and reliability of the storage devices. Simply adding storage units to increase storage capacity causes a corresponding increase in the probability that any one unit will fail. On the other hand, increasing the size of existing units, absent any other improvements, tends to reduce speed and does nothing to improve reliability.

Recently there has been considerable interest in arrays of direct access storage devices, configured to provide some level of data redundancy. Such arrays are commonly known as "RAIDs" (Redundant Array of Inexpensive (or Independent) Disks). Various types of RAIDs providing different forms of redundancy are described in a paper entitled "A Case for Redundant Arrays of Inexpensive Disks (RAID)", by Patterson, Gibson and Katz, presented at the ACM SIGMOD Conference, June, 1988. Patterson, et al., classify five types of RAIDs designated levels 1 through 5. The Patterson nomenclature has become standard in the industry.

The underlying theory of RAIDs is that a number of relatively inexpensive, small disk drives can provide the capacity of a single larger, expensive drive. The smaller drives will also be faster because they will all be reading or writing ("accessing") data at the same time. Finally, because the small drives cost so little, it is possible to include extra (redundant) disk drives which, in combination with certain storage management techniques, permit the system to recover the data stored on one of the small drives should it fail. Thus, RAIDs permit increased capacity, performance, and reliability.

Using the Patterson nomenclature, RAID levels 3 and higher (RAID-3, RAID-4, RAID-5) employ parity records for data redundancy. Parity records are formed from the Exclusive-OR of all data records stored at a particular location on different storage units in the array. In other words, in an array of N storage units, each bit in a block of data at a particular location on a storage unit is Exclusive-ORed with every other bit at that location in a group of (N–1) storage units to produce a block of parity bits; the parity block is then stored at the same location on the remaining (Nth) storage unit. If any storage unit in the array fails, the data contained at any location on the failing unit can be regenerated by taking the Exclusive-OR of the data blocks at the same location on the remaining devices and their corresponding parity block.

In a RAID-3, all the read/write actuators on the different disk drives act in unison to access data on the same location of each drive. RAID-4 and RAID-5 are further characterized by independently operating read/write actuators in the disk drive units. In other words, each read/write head of a disk drive unit is free to access data anywhere on the disk, without regard to where other units in the array are accessing data.

One of the problems encountered with parity protected disk arrays having independent read/writes (i.e., RAID-4 or RAID-5) is the overhead associated with updating the parity block whenever a data block is written. Typically, the data block to be written is first read and the old data Exclusive-ORed with the new data to produce a change mask. The parity block is then read and Exclusive-ORed with the change mask to produce the new parity data. The data and parity blocks can then be written. Thus, two read and two write operations are required each time data is updated.

In both RAID-3 and RAID-4, the parity records are stored on a single disk unit. U.S. Pat. No. 4,761,785 to Clark et al., which is hereby incorporated by reference, describes a type of independent read/write array in which the parity blocks are distributed substantially equally among the disk storage units in the array. Distributing the parity blocks shares the burden of updating parity among the disks in the array on a more or less equal basis, thus avoiding potential performance bottlenecks that may arise when all parity records are maintained on a single dedicated disk drive unit. Patterson et al. have designated the Clark array RAID-5. RAID-5 is the most advanced level RAID described by Patterson, offering improved performance over other parity protected RAIDs.

In theory, a RAID-5 as described in Clark equalizes the burden of parity updating among all the disk drives. However, in real systems it is very difficult to achieve an absolutely equal distribution of this burden. Data storage accesses tend to exhibit a phenomenon known as "locality" That is, some of the data stored in a disk array will be accessed much more frequently than other data. The more frequently accessed data tends to be clustered together. As a result, the disk unit having the parity block for the most frequently accessed data will carry more than its "fair share" of the parity updating burden.

SUMMARY OF THE INVENTION

It is therefore an object of the present invention to provide an enhanced method and apparatus for storing data in a computer system.

Another object of this invention is to provide an enhanced method and apparatus for managing a redundant array of storage devices in a computer system.

Another object of this invention is to increase the performance of a computer system having a redundant array of storage devices.

Another object of this invention to more equally distribute the data access operations among different storage devices in a computer system having a redundant array of storage devices in which the storage devices access data independently.

Another object of this invention is to reduce contention for the parity blocks in a redundant array of storage devices.

An array storage controller services multiple data storage units in an array. Specifically, the array is preferably a RAID-5, modified as described in the succeeding paragraphs. I.e., a storage management mechanism resident on the controller maintains parity records on the storage units it services. Each data storage unit accesses data concurrently with the other data storage units, but at locations which are independent of the accesses being made by the other storage units. Parity records are distributed among different disk units.

Unlike the RAID-5 disclosed in Clark, parity records in accordance with the present invention are produced by exclusive OR-ing data along a diagonal "stripe", and are stored along "parity" rows in the address matrix. I.e., if data addresses in an array are represented as a two-dimensional address matrix, in which each column represents a different disk unit, and each row represents a range of address space (block) on the disk units, Clark generates parity by exclusive OR-ing data blocks along a horizontal row of the matrix. According to the present invention, however, parity is generated by exclusive OR-ing the different blocks along diagonals of the matrix.

In order to distribute parity blocks among the different disk units, Clark arranges them along diagonals of the matrix. However, because parity is computed along the diagonal according to the present invention, it is not necessary to arrange parity blocks on a diagonal. It is not only possible, but desirable, to arrange parity blocks in one or more rows of the matrix.

In most RAIDs, blocks having successive logical addresses are located across the same row. If data accesses exhibit "locality", some row will have a greater number of data accesses. Under the Clark RAID-5 arrangement, the parity block for this row will be updated more frequently, with a resultant performance bottleneck. In accordance with the present invention however, there is no parity block for any single row. The parity records for the most frequently accessed row will be formed by exclusive-ORing across the diagonals that pass through the row, and the resultant parity blocks will be distributed among the different data storage units. Preferably, diagonal parity stripes are also shifted to reduce the incidence of contiguous data blocks on a single disk device (column) having corresponding parity blocks on the same disk device.

Arranging the parity blocks on rows of the matrix has additional performance advantages. A "row" of the matrix corresponds to a the same physical address range on each disk drive, i.e., an annular region of the disk surface. Parity blocks can therefore be confined to particular logical address ranges and particular physical regions of the disk surface. Depending on the application, this relay simplify address translation, simplify modification of the array, or improve performance.

BRIEF DESCRIPTION OF THE DRAWINGS

FIGS. 8A & 8B show an array of data and parity blocks having four parity devices in accordance with the preferred embodiment of the present invention;

FIGS. 9A & 9B show an array of data and parity blocks having eight parity devices in accordance with the preferred embodiment of the present invention;

DETAILED DESCRIPTION OF THE PREFERRED EMBODIMENT

Figure 1:
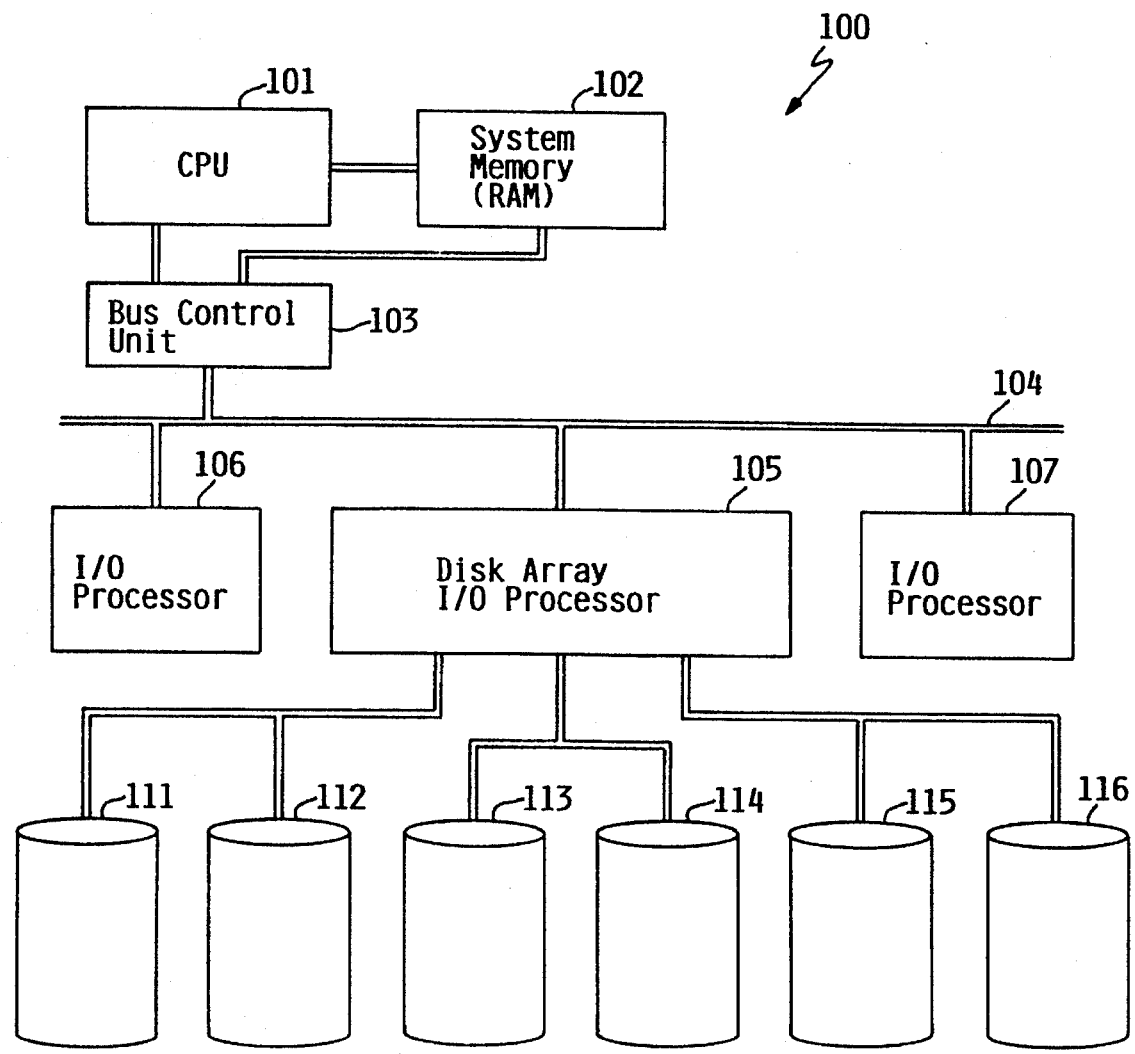
FIG. 1 is a block diagram of a computer system incorporating the components of the preferred embodiment of this invention.

A block diagram of the major components of computer system 100 of the preferred embodiment of the present invention is shown in FIG. 1. System central processing unit (CPU) 101 and system memory 102 are coupled to system bus 104 through bus interface unit 103. System bus 104 is used for communicating data among various components of system 100. Several I/O processors 105–107 are attached to bus 104. I/O processors 105–107 handle communications of data with storage devices, workstations, local area networks, and other systems. In particular, disk array I/O processor (IOP) 105 handles communications between bus 104 and an array of storage units 111–116, and controls the operation of the storage units. In the preferred embodiment, units 111–116 are rotating magnetic disk drive storage units. While six storage units are shown in FIG. 1, it should be understood that the actual number of units attached to IOP 105 is variable. It will also be understood by those skilled in the art that computer system 100 may have additional components not shown in FIG. 1, and may for example have multiple buses, additional memory devices, more than one disk array I/O processor, etc. In the preferred embodiment, computer system 100 is an IBM AS/400 computer system, although other computer systems could be used.

Figure 2:
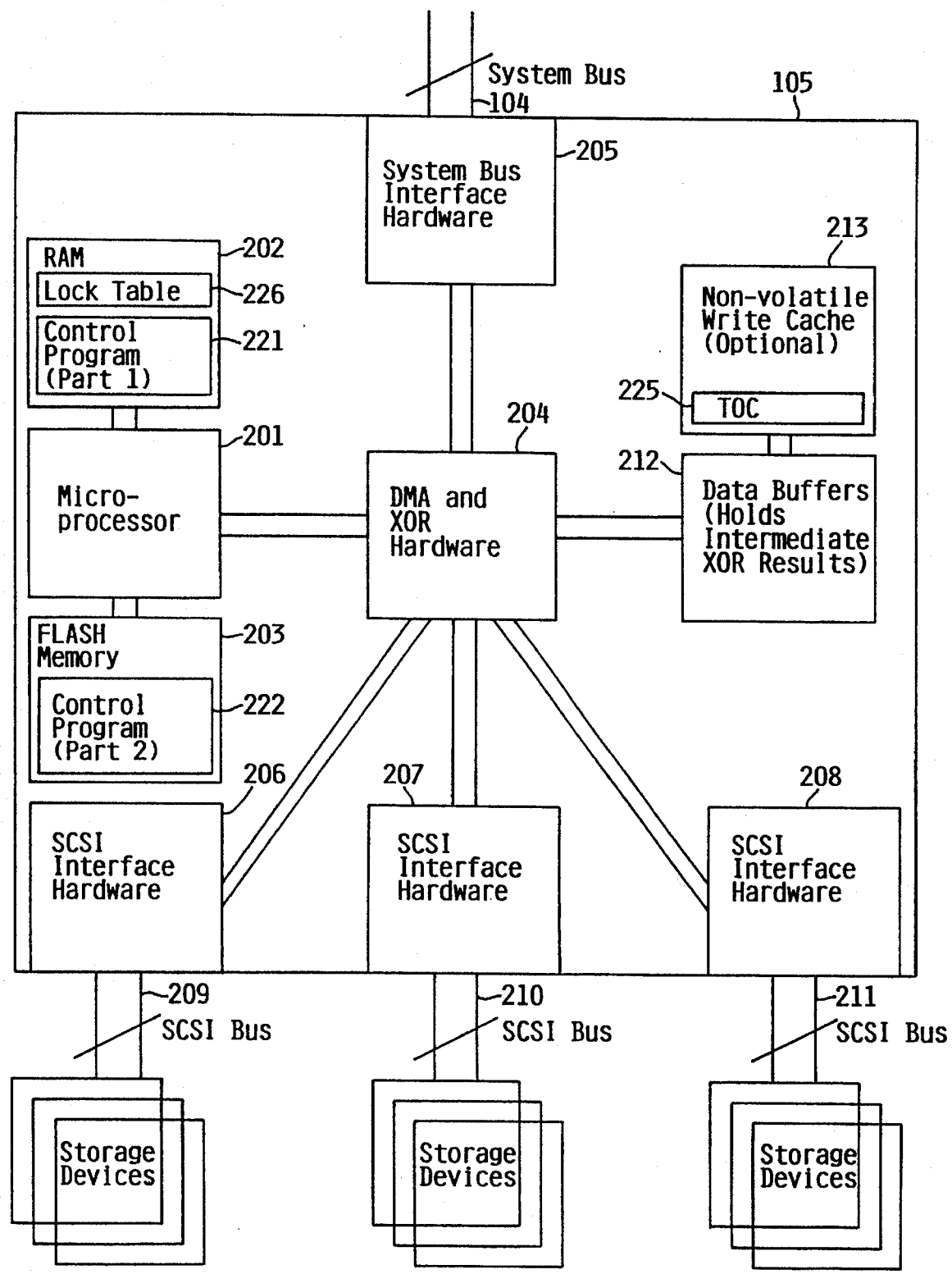
FIG. 2 is a diagram of the major components of a disk array controller I/O processor according to the preferred embodiment.

FIG. 2 is a block diagram showing in greater detail the major components of disk array IOP 105 according to the preferred embodiment. IOP 105 comprises programmable microprocessor 201 which executes a control program directing the operation of controller 105. In the preferred embodiment, microprocessor 201 is an Intel 80960 microprocessor, although other microprocessors could be used. Microprocessor 201 is coupled to volatile random access memory (RAM) 202 and non-volatile flash memory 203. System bus interface hardware 205, which is directly coupled to system bus 104, handles communications with other parts of system 100. Interface hardware 205 includes registers, drivers and other hardware as required to receive data and commands from system bus 104 and to transmit data and commands from IOP 105 to other system components via system bus 104. SCSI interface hardware 206,207, 208 handle communications with disk drive units along three separate buses 209,210,211 using the Small Computer Systems Interface (SCSI) protocol. A special set of hardware registers and logic, identified as "DMA and XOR hardware" block 204, performs exclusive-ORing functions on data and enables data to be routed directly from one controller component to another. A set of data buffers 212 is used to hold intermediate exclusive-OR results when updating parity as a result of newly written data, or when recovering data. Non-volatile write cache 213 is a random access cache memory with standby battery power. Write cache 213 is used to improve performance when writing data to the disk drives, as explained below. Write cache 213 contains a table of contents (TOC) data structure 225, which lists the contents of the cache and state information, particularly, whether the data has been written to a storage device.

Programmable microprocessor 201 controls the operation of array IOP 105 by executing a storage management control program 221,222 resident in memories 202 and 203. Portions of control program 221,222 for microprocessor 201 are stored respectively in RAM 202 and flash memory 203. Preferably, a relatively small portion of control program 222 is stored in flash memory 203. Portion 222 is used to initialize IOP 105. The larger part of control program 221, which controls normal operation of IOP 105, is stored in RAM 202. Portion 221 is stored in one of the disk storage units, or elsewhere on computer system 100, and is loaded into RAM 202 when the system is initialized. RAM 202 contains lock table 226, which records the locked state of each parity stripe in the array. Locks are used to prevent access to data blocks which might compromise data integrity, e.g., by preventing two concurrent write operations to different blocks in the same stripe which could result in erroneous parity. RAM 202 and flash memory 203 contain additional configuration and state information (not shown) necessary to the operation of control program 221,222.

Figure 3:
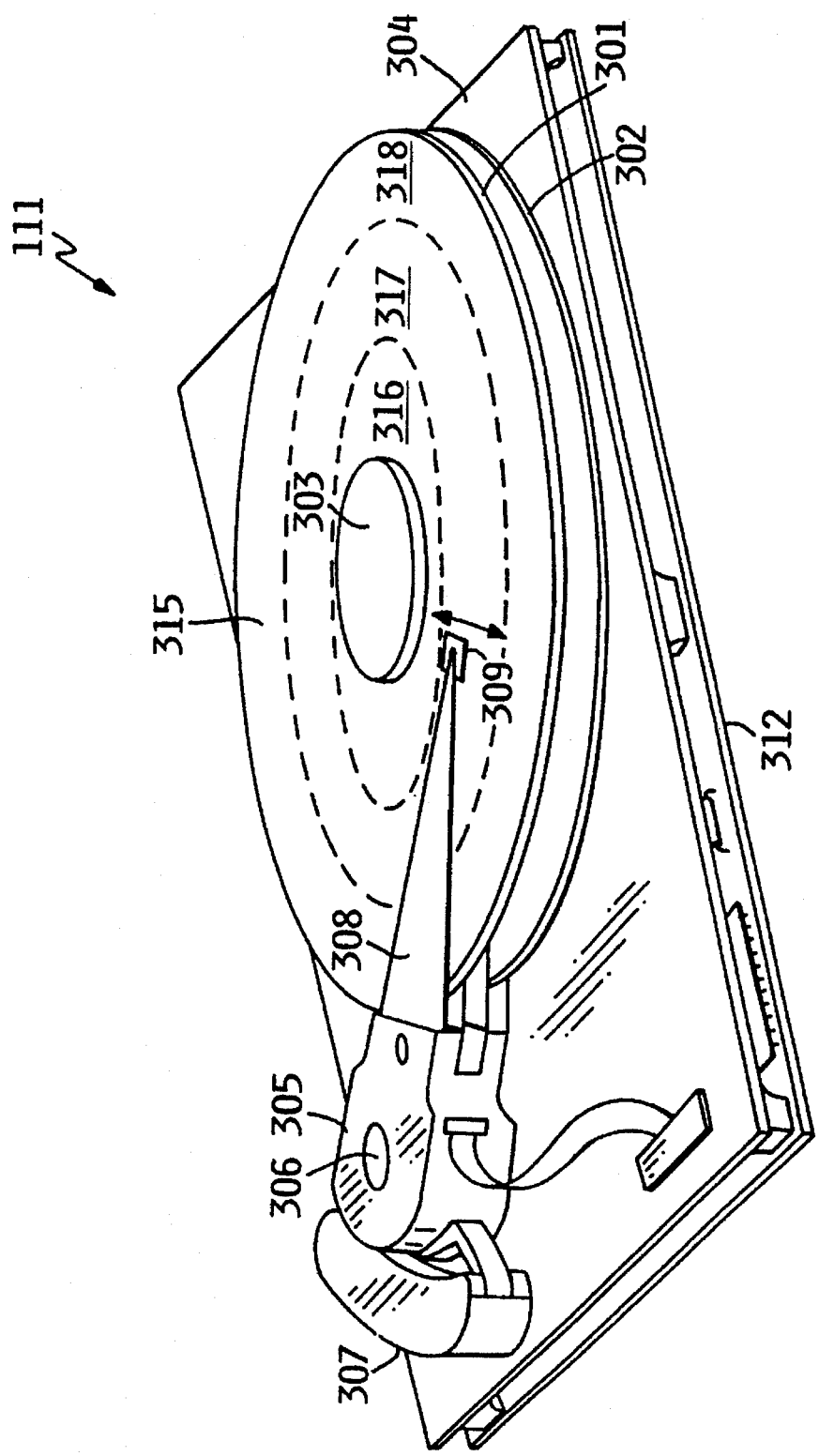
FIG. 3 is shows a typical magnetic disk drive storage unit used in the computer system of the preferred embodiment.

FIG. 3 shows in greater detail a typical magnetic disk drive storage unit 111. In the preferred embodiment, all disk drive storage units 111–116 are identical in construction, having the same data capacity, speed, and other operating characteristics. Disk unit 111 comprises rotatable disks 301,302, which are rigidly attached to common hub or spindle 303, which is mounted on base 304. Spindle 303 and disks 301,302 are driven by a drive motor (not visible) at a constant rotational velocity. Comb-like actuator assembly 305 is situated to one side of disks 301,302. Actuator 305 rotates through an arc about shaft 306 parallel to the axis of the spindle, driven by an electromagnetic motor 307, to position the transducer heads. A cover (not shown) mates with base 304 to enclose and protect the disk and actuator assemblies. Electronic modules for controlling the operation of the drive and communicating with another device, such as a host computer, are contained in circuit card 312, typically mounted outside the enclosure. A plurality of head/suspension assemblies 308 are rigidly attached to the prongs of actuator 305. An aerodynamic read/write transducer head 309 is located at the end of each head/suspension assembly 307 adjacent the disk surface.

Typically, data is recorded on both flat surfaces of each disk 301,302, making four data recording surfaces where two disks are used. However, it should be understood that the number of disks in a disk drive may vary, and that it is not essential to use both surfaces of each disk. There is one head/suspension assembly 308 for each recording surface. Recording surface 315 of disk 301 is visible in FIG. 3. Surface 315 comprises a plurality of concentric tracks on which data is recorded. A grouping of adjacent tracks forms a annular region on the disk surface. FIG. 3 shows annular regions 316–318 near the inner diameter, the middle, and the outer diameter respectively, of disk surface 315, it being understood that additional annular regions could be defined.

Data on disk units 111–116 is maintained such that it is redundantly stored, i.e., the failure of any one of units 111–116 will not result in loss of data. In particular, disk units 111–116 are operated as a redundant array of independent disks (RAID) at RAID level 5. Data records are stored in discrete blocks on the disk units, and each disk drive independently accesses data. Parity blocks are generated as functions of sets of data blocks, and the individual parity blocks are distributed among different disk drives of the array. The manner in which parity blocks are generated as functions on sets of data blocks is explained below.

Figure 4:
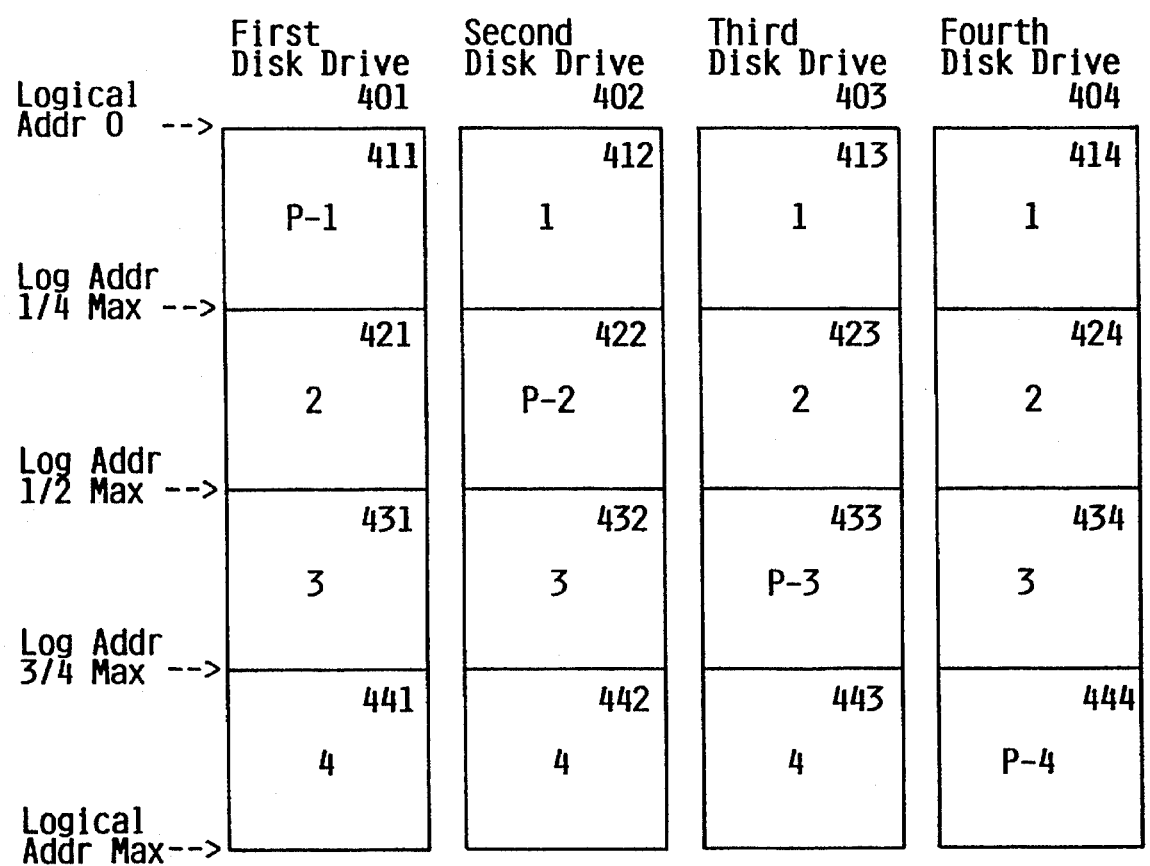
FIG. 4 is an address matrix of a disk array showing an arrangement of data blocks and parity blocks in accordance with the prior art.

FIG. 4 is an address matrix showing a mapping of sets of data blocks and parity blocks in a RAID-5 disk array having four disk units 401–404, in accordance with the prior art as disclosed in U.S. Pat. No. 4,761,785 to Clark et al., herein incorporated by reference. Each column of the address matrix represents the total range of address space on a single disk drive unit. Each row represents the same portion (block) of the total range of logical address space on each respective disk unit. Generally, blocks of data in the same row are stored at the same respective physical location of each disk unit 401–404 (although occasionally small segments of data may have to be relocated to a reserved area of the disk due to a defective sector).

As used herein, "data block" or "parity block" refer to the largest contiguous set of addresses on a single disk unit belonging to the same parity stripe. This is not necessarily the same as the smallest unit of data that can be accessed by a single access request, which is also sometimes referred to as a "block" in the disk drive art, and for clarity will be referred to herein as an "access block". Where the term "block" is used alone, it should be understood to refer to a parity or data block, as defined above. While the data or parity blocks of the present invention could in fact be single access blocks, they are typically much larger.

Referring to FIG. 4, parity blocks 411,422,433, 444 are located on diagonals of the address matrix. Each parity block stores parity records which can be generated by exclusive-ORing data at the corresponding address on each respective disk unit. Thus, parity block 411 represents the exclusive-OR of data blocks 412–414 in the first row of the matrix. These are the data blocks located in the lowest logical address range of each disk drive 401–404. Parity block 422 is the exclusive-OR of data blocks 421,423,424 in the second row, and so on for the remaining parity blocks. The set of a parity block and its associated data blocks is sometimes called a "parity stripe". In the array of FIG. 4, each row of the array is a separate parity stripe.

Although parity blocks 411,422,433,444 of FIG. 4 are distributed on the different disk drive units, parity accesses will not necessarily be evenly distributed. If data blocks in a particular row, for example blocks 412–414, require updating much more frequently than other data blocks, then the corresponding parity block 411 will require more frequent updating than the other parity blocks, imposing a disproportionate share of the load on the disk drive containing parity block 411. This may also create a bottleneck for access to parity block 411. For example, if block 412 and 413 need to be updated, the writing of block 413 may need to wait until the writing of block 412 and corresponding parity update of block 411 completes.

In accordance with the present invention, the above result is avoided by placing parity blocks in rows, and computing parity along diagonals, as explained below. In other words, the parity stripes run along diagonals of the address matrix rather than along rows.

Figure 5:
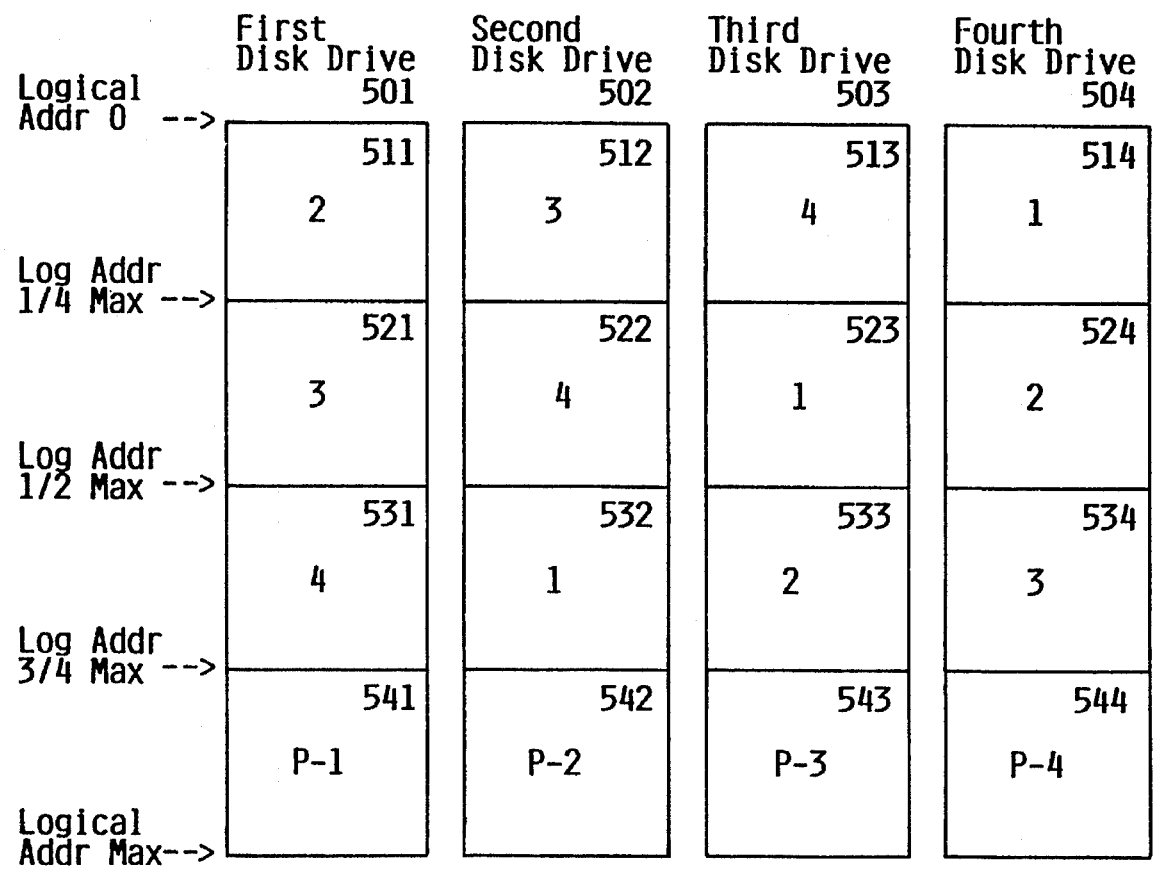
FIG. 5 shows an array of data and parity blocks in accordance with a simplified embodiment of the present invention.

FIG. 5 represents an arrangement of data and parity blocks on four disk drive units 501–504 in accordance with a simplified embodiment of the present invention. Parity blocks 541–544 are located along a single row of the address matrix, meaning that they are located in the same address range, which in this embodiment is the highest ¼ of the logical addresses available. Parity block 541 represents the exclusive-OR of data blocks 514, 523,532, which are located along a diagonal of the matrix. Similarly, parity block 542 represents the exclusive-OR of data blocks 511, 524,533, parity block 543 represents the exclusive-OR of data blocks 512,521,534, and parity block 544 represents the exclusive-OR of data blocks 513,522,531. It will be observed that the arrangement depicted in FIG. 5 reduces the aforementioned problems with locality of reference. If, for example, data blocks 511–513 (the first three blocks in the first row) require more frequent updating than the other data blocks, the burden of updating parity is distributed among parity blocks 542–544.

While the arrangement of parity and data blocks depicted in FIG. 5 illustrates the present invention in its most basic form, in practice an address mapping is typically more complex. There are several reasons for this, as explained below.

It is generally undesirable to have very large data and parity blocks. If blocks are too large, the same phenomenon of locality of reference may cause uneven usage of the disk drive units, even where the present invention is employed. For example, in the array of FIG. 5, each data block represents 1/12 of the total data stored in the array. If the pattern of data accesses exhibits strong locality, it is possible that a single data block will be accessed much more frequently than the others, and this will of course place a disproportionate share of the load on the disk unit on which that block is stored, and also on the disk unit on which the corresponding parity block is stored. The smaller the block size, the more even will be the distribution of data accesses. There are, however, certain disadvantages to smaller block size. The address map becomes larger and more difficult to maintain. Additionally, as blocks become smaller, a larger proportion of the data access requests will require access to multiple blocks. The choice of optimum block size is a design consideration which must take into account these and other factors, but block size will usually be much smaller than the ¼ of the available address space of a disk unit depicted in FIG. 5.

Figure 6:
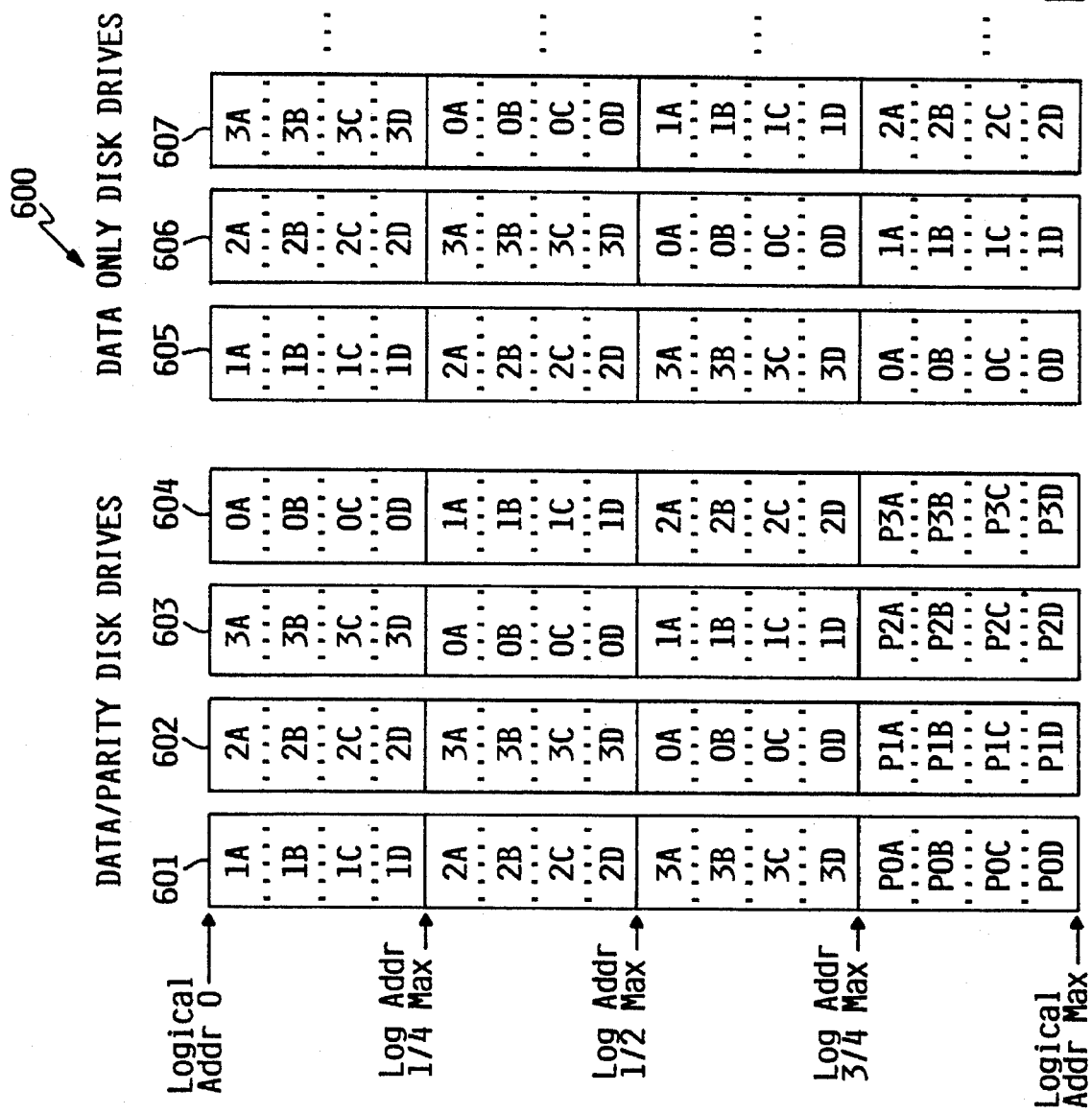
FIG. 6 shows an array of data and parity blocks in accordance with a second embodiment of the present invention.

FIG. 6 shows an array 600 of data and parity blocks in accordance with a second embodiment of the present invention. In the embodiment of FIG. 6, the array comprises seven disk drive units 601–607, and the address space of each disk unit 601–607 is divided into 16 blocks. Parity blocks, which begin with a "P" designation, are located in the highest ¼ of the address space of disk units 601–604. The data blocks corresponding to each parity block have the same designation, without the "P". Thus, for example, data blocks labelled "OA" on disk units 602–607 correspond to the parity block labelled "POA" on disk unit 601. I.e., parity block "POA" contains the block obtained by successive exclusive-ORing of all the blocks labelled "OA".

It will be observed that in the embodiment of FIG. 6, the parity blocks are confined to fewer than all of the disk units of the array. It would have been possible to spread the parity blocks on all the disk units, as in the embodiment of FIG. 5. Indeed, spreading parity on all units will theoretically achieve maximum performance through distribution of the burden of updating parity. The embodiment of FIG. 6 is chosen for several reasons. By confining parity to a pre-selected number of disk drives, it is easier to add disk drives to an existing array because it will not be necessary to move parity blocks. Furthermore, the addressing scheme becomes easier. Disk units 601–604 always have the same amount of data available for use. To other components of computer system 100, disk units 601–604 appear to be units having a capacity of ¾ of their actual capacity. The system is generally unaware that the additional ¼ of the addresses exist, or that parity is being maintained by IOP 105. A data access specified by system CPU 101 to a particular disk address on one of units 601–604 is written to that address. Parity blocks are placed in the upper ¼ of the address range, rather than in the middle, to avoid the need for address translation when CPU 101 specifies data at a particular address.

The array shown in FIG. 6 may have initially been an array of only four disk drives, comprising units 601–604. When a fifth drive 605 was added, each data block of drive 605 was assigned to one of the parity blocks of the existing array, without relocating the parity block. Thereafter, any updates to the block in drive 605 required a corresponding update to the associated parity block located in one of the original disk units 601–604. As drives 606,607 are added to the array of FIG. 6, the data blocks on these drives are assigned to existing parity stripes in the same manner. It would be possible to add additional drives (not shown) to the array of FIG. 6 in a similar manner.

Figure 7:
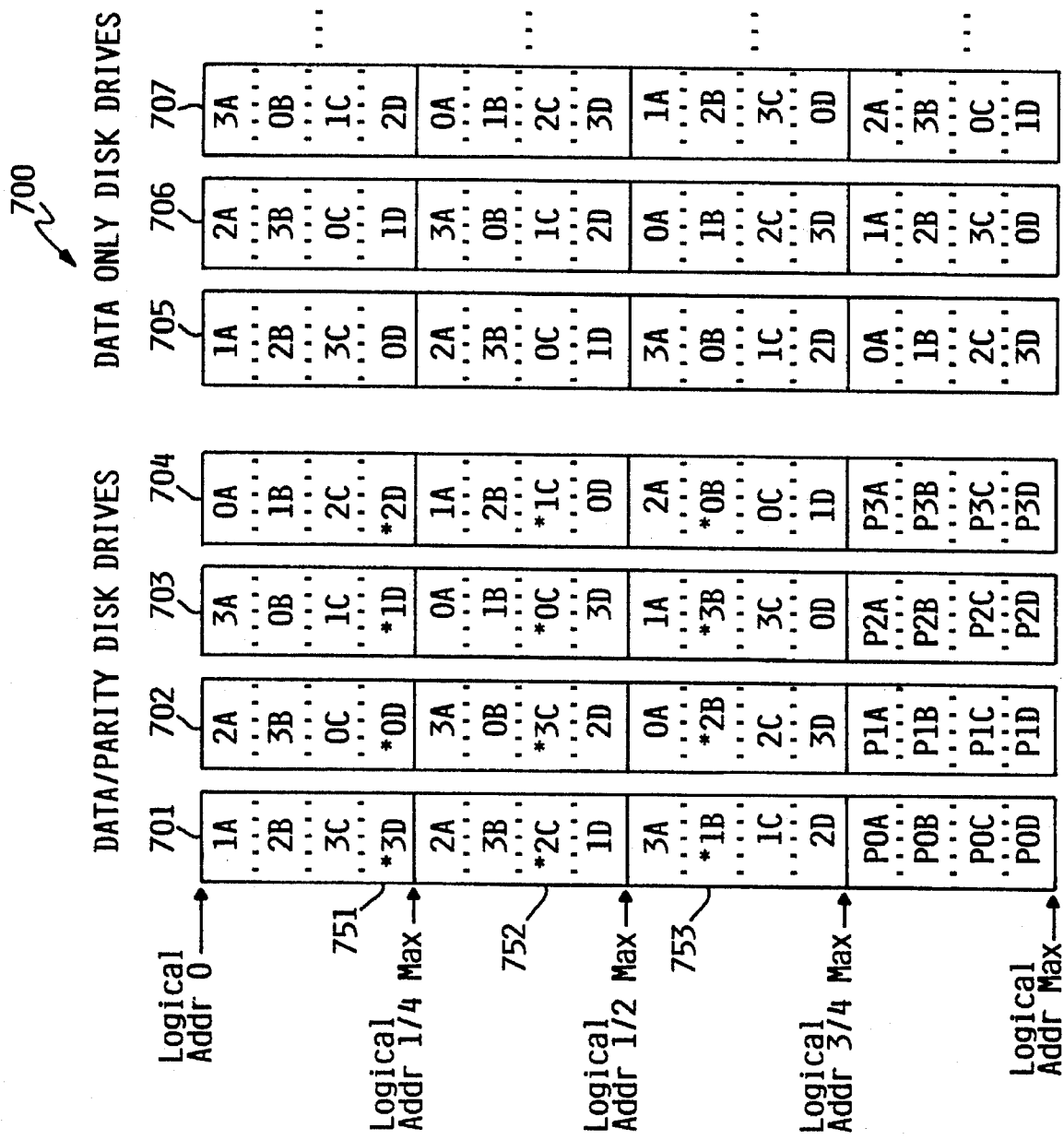
FIG. 7 shows an array of data and parity blocks in accordance with a third embodiment of the present invention.

FIG. 7 shows an array 700 of data and parity blocks in accordance with a third embodiment of the present invention. In the embodiment of FIG. 7, an additional refinement is introduced over the embodiment of FIG. 6, at the cost of some minor added complexity in determining parity stripe location. Parity blocks of array 700 are located on disk units 701–704, similarly to array 600 of FIG. 6. However, stripes are arranged somewhat differently to avoid an arrangement wherein contiguous blocks of data on the same disk unit are associated with blocks of parity on a single disk unit.

Referring to FIG. 6, data blocks 3A, 3B, 3C and 3D on unit 601 are part of the stripes associated with parity blocks P3A, P3B, P3C and P3D, respectively. Parity blocks P3A, P3B, P3C, and P3D of array 600 are located on a single disk unit 604. Therefore, if there is locality of reference between adjacent blocks 3A, 3B, 3C and/or 3D and these blocks are accessed more frequently, this could result in contention for disk unit 604 which contains the corresponding parity blocks.

In array 700 shown in FIG. 7, stripes associated with the first row of parity blocks (i.e., parity blocks P0A, P1A, P2A, and P3A) are arranged in the same manner as in array 600 of FIG. 6. However, the remaining stripes are "shifted" horizontally as shown to avoid locating the parity blocks for vertically contiguous blocks on the same disk unit. Additionally, stripes are arranged to always skip the disk unit containing the corresponding parity block. It should be understood that data is not actually "shifted" from one disk unit to another, but that the association of data blocks with parity blocks is "shifted".

More specifically, the parity stripes containing blocks in the "B" rows (blocks with "B" designations), corresponding to parity blocks in the second row of parity blocks, i.e., parity blocks P0B, P1B, P2B and P3B, are shifted one disk unit to the left relative to the "A" rows. Parity stripes containing blocks in the "C" rows are shifted two disk units to the left, and parity stripes containing blocks in the "D" rows are shifted three units to the left. Additionally, certain rows 751–753 of the first four disk units 701–704 are shifted again to avoid associating a data block with a parity block on the same disk (which would violate principles of data redundancy). For example, if row 751, a "D" row, were shifted three times to the left, block 0D would be on data unit 701, the same unit which stores the corresponding parity block P0D. To avoid this situation, row 751 is shifted only twice to the left.

Figure 8B:
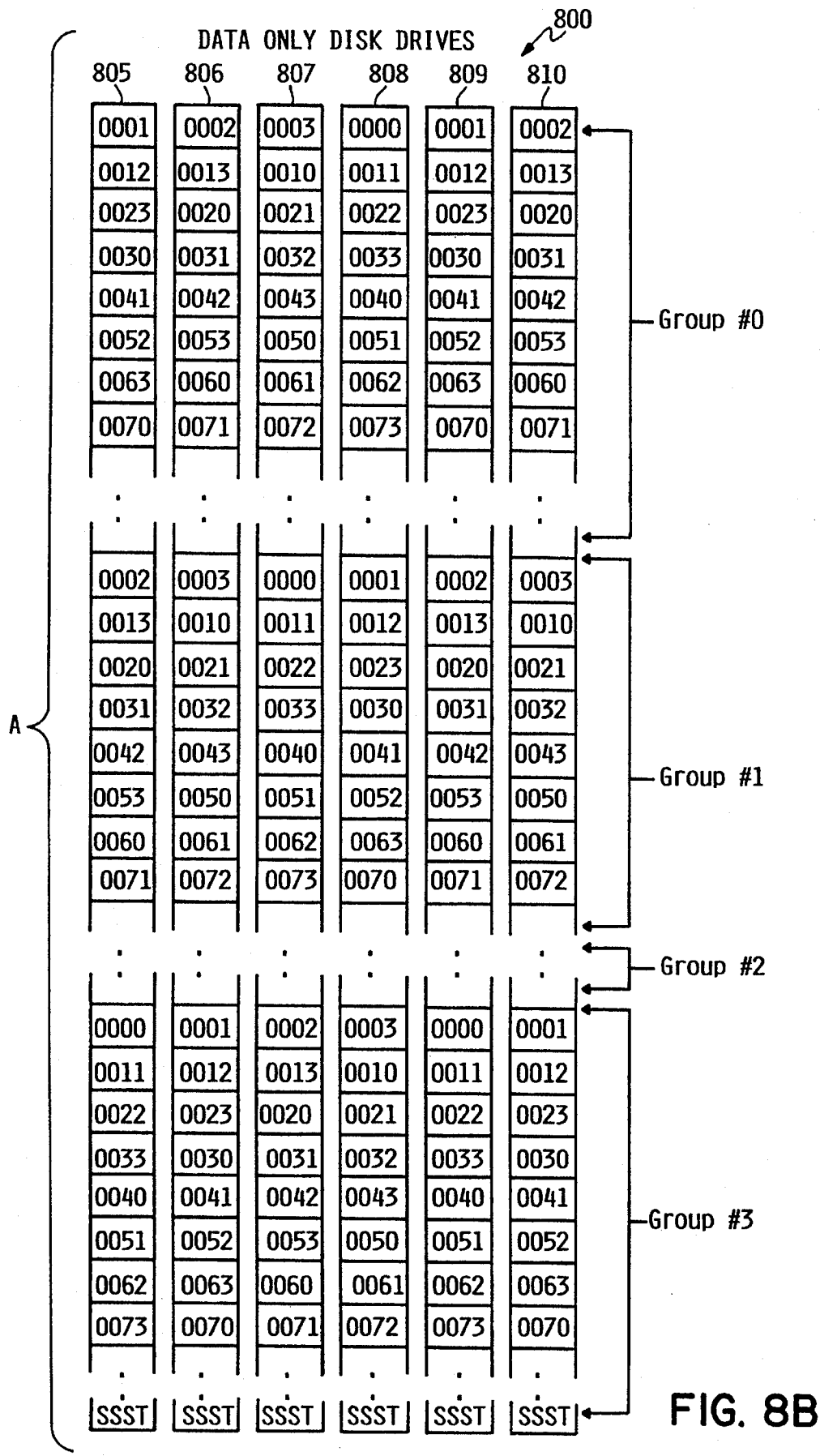

FIGS. 8A & 8B show an array 800 of data and parity blocks having four parity devices in accordance with the preferred embodiment of the present invention. In the preferred embodiment, each disk drive unit 801–810 contains a larger number of blocks than can be shown in the diagram, and these additional blocks are represented as gaps. In the preferred embodiment, each data or parity block contains 1024 access blocks, or about 500K bytes of data. Each disk unit stores approximately 1–4 giga-bytes (billion bytes) of data, so the number of blocks in each disk drive unit is in the order of several thousand, it being understood that the principles of the present invention are applicable to drives having virtually any number of blocks. Array 800 is essentially the same as array 700, but has a larger number of blocks and disk drive units.

Figure 9B:
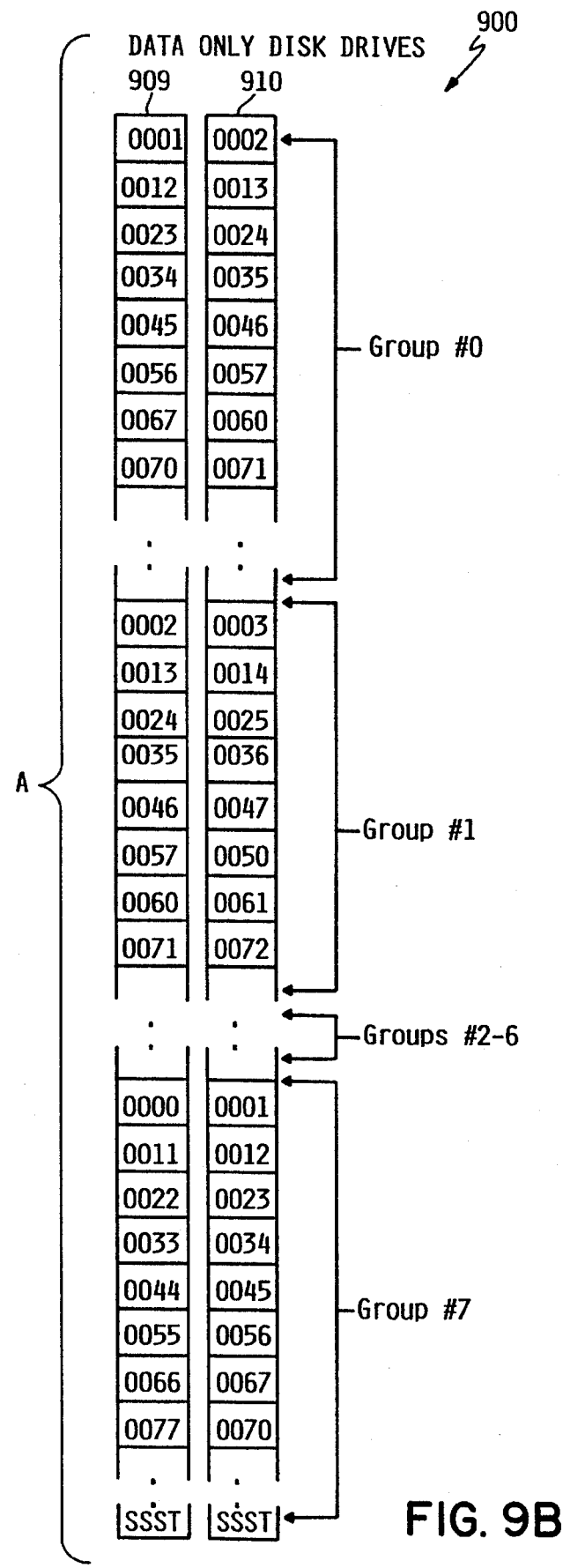

FIGS. 9A & 9B show an array 900 of data and parity blocks having eight parity devices in accordance with the preferred embodiment of the present invention. Parity blocks in array 900 are distributed on disk units 901–908. Array 900 is configured according to the same principles as array 800, and except for the spreading of parity blocks on a larger number of disks and adjustments required as a direct result, the two arrays are the same.

IOP 105 of the preferred embodiment supports either array 800 or array 900, i.e., arrays having either four or eight parity devices. This limitation was chosen to simplify control program 221,222, other parts of the system which interact with the array, and the operations required to add devices to an existing array. However, it should be understood that the present invention could be practiced with varying numbers of disk units, and with parity blocks spread on all or some portion of the disk units.

For help in understanding the derivation of parity addresses discussed below, the following terminology is used. Referring to FIGS. 8A & 8B, disk units 801–810 within the array are assigned numbers 0 to 9, respectively. The available storage in the array 800 is divided into as many "groups" as there are disk units storing parity blocks, which in this case is four (disk units 801–804). The groups are numbered 0–3. Each group comprises a plurality of contiguous rows of blocks. Rows of blocks within each group are numbered starting from 0, the number of any row being unique within the group, but not within the array. Thus, any particular block in the array may be specified by specifying the group number, the row number within the group, and the disk unit number.

The numbers within the blocks of arrays 800 and 900 are four-digit hexadecimal parity stripe identifiers which designate the parity stripe to which the blocks belong. For each parity stripe (i.e. each set of one parity block and the corresponding data blocks of which the parity block represents the exclusive-OR), there is one unique parity block in the high address group of the array, i.e. group #3 of array 800 or group #7 of array 900. The highest order three digits of the identifiers specify a row number. Note that all blocks of a particular parity stripe are located at the same row number, although they are spread among different groups. The lowest digit specifies the disk unit on which the parity block is located.

In arrays 800 and 900 of FIGS. 8A & 8B and 9A & 9B, some of the blocks contain an 'X' in the fourth digit of the parity stripe identifier. These are the blocks for which the parity stripe is "shifted" as explained above with reference to array 700 of FIG. 7. The formula for shifting these stripes in the preferred embodiment is explained below, it being understood that other shifts could be employed, so long as none of the data blocks of a stripe is located on the same disk unit as the corresponding parity block.

In the preferred embodiment, all parity maintenance is performed in controller IOP 105. IOP 105 receives requests to access data from some component of system 100 (e.g., from CPU 101), the requests being transmitted on system bus 104. The requests include the disk unit and logical address of the data within the unit, but not the location of the parity block. From this information, IOP 105 must be able to determine the parity block location and update parity. Additionally, in the event of failure of any single disk unit, IOP 105 must be able to reconstruct data. In order to do this, it must be able to determine the locations of all data blocks of a stripe corresponding to a particular parity block. These determinations are made by control program 221,222 executing on microprocessor 201, as explained below.

In the preferred embodiment, a disk unit number is assigned to each disk unit of the array when the array is initialized. The number of parity devices in the array is eight if there are eight or more disk units in the array; otherwise, it is four. The block size is fixed, so that the number of blocks in the array is determined by controller IOP 105 based on the number and size of disk units.

Whenever it is necessary to determine the parity stripe identifier (and location of the parity block) corresponding to a particular data block, as when a data block is updated, IOP 105 used the following procedure. The disk unit (Dev#) and logical address (LA) of the data block will be provided (e.g., when data is to be written, these are specified in the write request received on bus 104). IOP 105 determines the group number (Group#) of the data block from the logical address, the group number being the address divided by the number of addresses per group, rounded down to an integer. Similarly, the row number (Row#) within the group is derived directly from the logical address (LA) by the formula:

$$\text{Row\#} = \frac{(LA - (\text{Group\#} * \text{Number addr per group}))}{\text{Number of addr per row}}$$

The disk unit on which the parity block is located (parity device number, or P-Dev#) is tentatively determined by the formula:

P-Dev#=(Dev#+Group#+Row#+1) MOD NPDevices where NPDevices is the number of parity devices in the array, being four for array 800 and eight for array 900. If the parity device number (P-Dev#) as computed above is the same as the device number (Dev#) of the data, then the "shift" is performed, and the parity device number is computed according to the following alternate formula:

P-Dev#=(Dev#−Group#−1) MOD NPDevices The parity stripe identifier is thus formed by concatenating three digits of the Row# with one digit of the P-Dev#. Because parity blocks are always located within the last group, the Row# and P-Dev# specify the unique location of the corresponding parity block by row and device.

When it is necessary to determine the location of all data blocks in a particular parity stripe, as for example when reconstructing data, the following procedure is used. The parity block identifier contains the row number (Row#) and device number (P-Dev#) of the parity block. The data blocks associated with this parity block are derived from the Row# and P-Dev#. There will be exactly one such data block on each disk unit (device) of the array, other than the device containing the parity block. On a given device having a device number Dev#, the data block will be located at row number Row# (the same as the parity block), and within the group given by the following formula:

Group#=(P-Dev#−Row#−Dev#−1) MOD NPDevices

By successively applying the above formula to each disk unit in the array, the disk unit and corresponding Group# and Row# of each data block in the parity stripe are obtained.

The operation of computer system 100 in conjunction with the hardware and software features necessary to the present invention will now be described. In normal operating mode, array controller IOP 105 receives data access requests (i.e. READ and WRITE commands) from other components of system 100 via bus 104. IOP 105 issues a completion message when the respective operation is complete. System CPU 101 and other system components do not participate in maintaining parity. If one of the disk units in the array fails, IOP 105 reconstructs the data on each block of the failed unit using the corresponding parity block and other data blocks of the same stripe.

Figure 10:
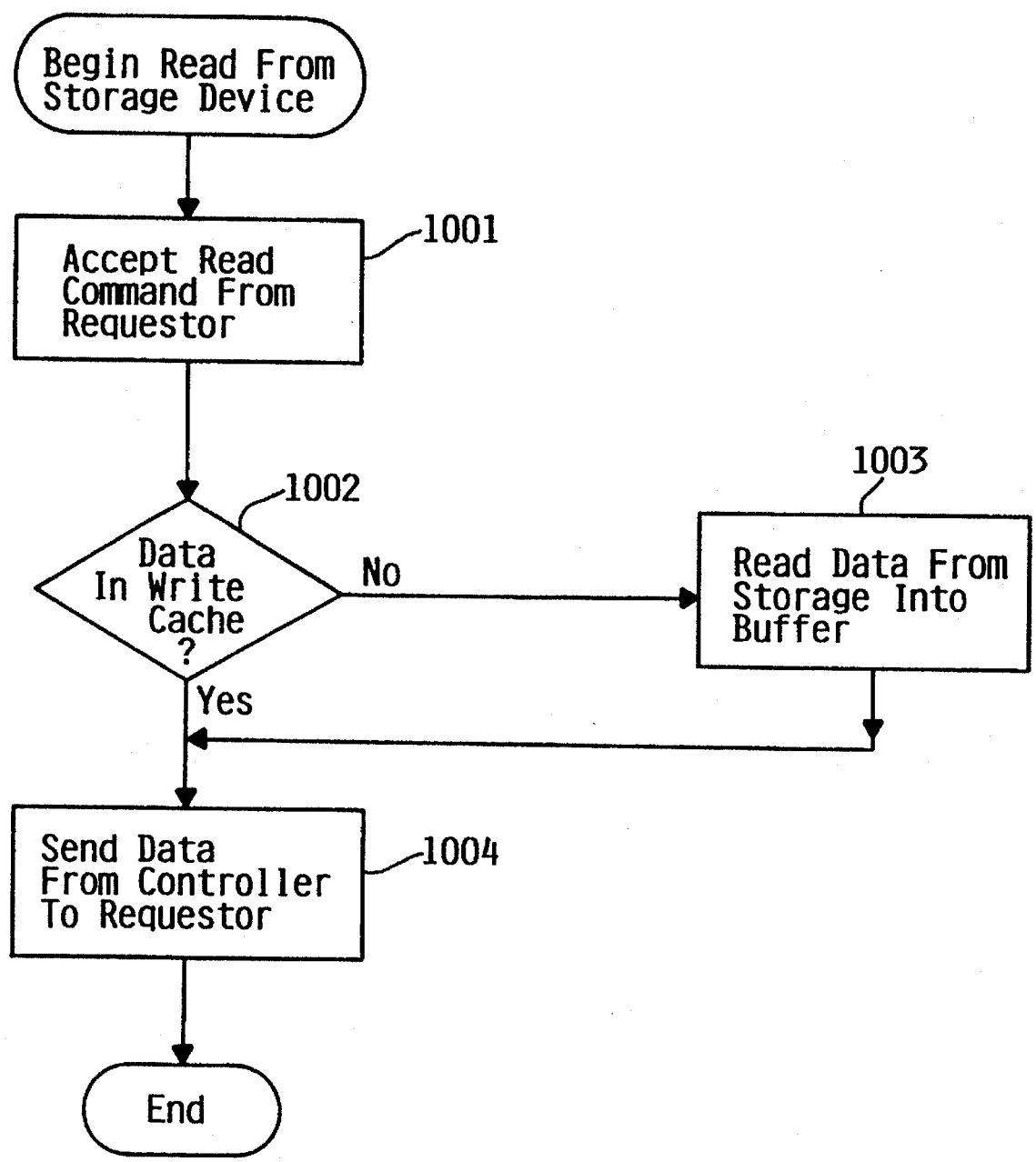
FIG. 10 is a flow diagram showing the steps required to perform a READ operation of data stored in the array in accordance with the preferred embodiment.

The steps performed by controller IOP 105, under the direction of control program 221,222 executing on microprocessor 105, to perform a READ operation in normal mode are shown in FIG. 10. The READ operation is performed by accepting a READ command from bus 104 at step 1001, and determining whether the data requested exists in non-volatile write cache 213 at step 1002. If so, the data in cache 213 is sent directly to the requester on bus 104 at step 1004. Otherwise, data is first read from the appropriate storage unit into buffer 212 at step 1003, and from there transferred to the system bus at step 1004. When reading data at step 1003, data is accessed directly at the logical address and disk unit specified in the READ request. It is not necessary to access parity or determine to which parity stripe the accessed data belongs.

Figure 11:
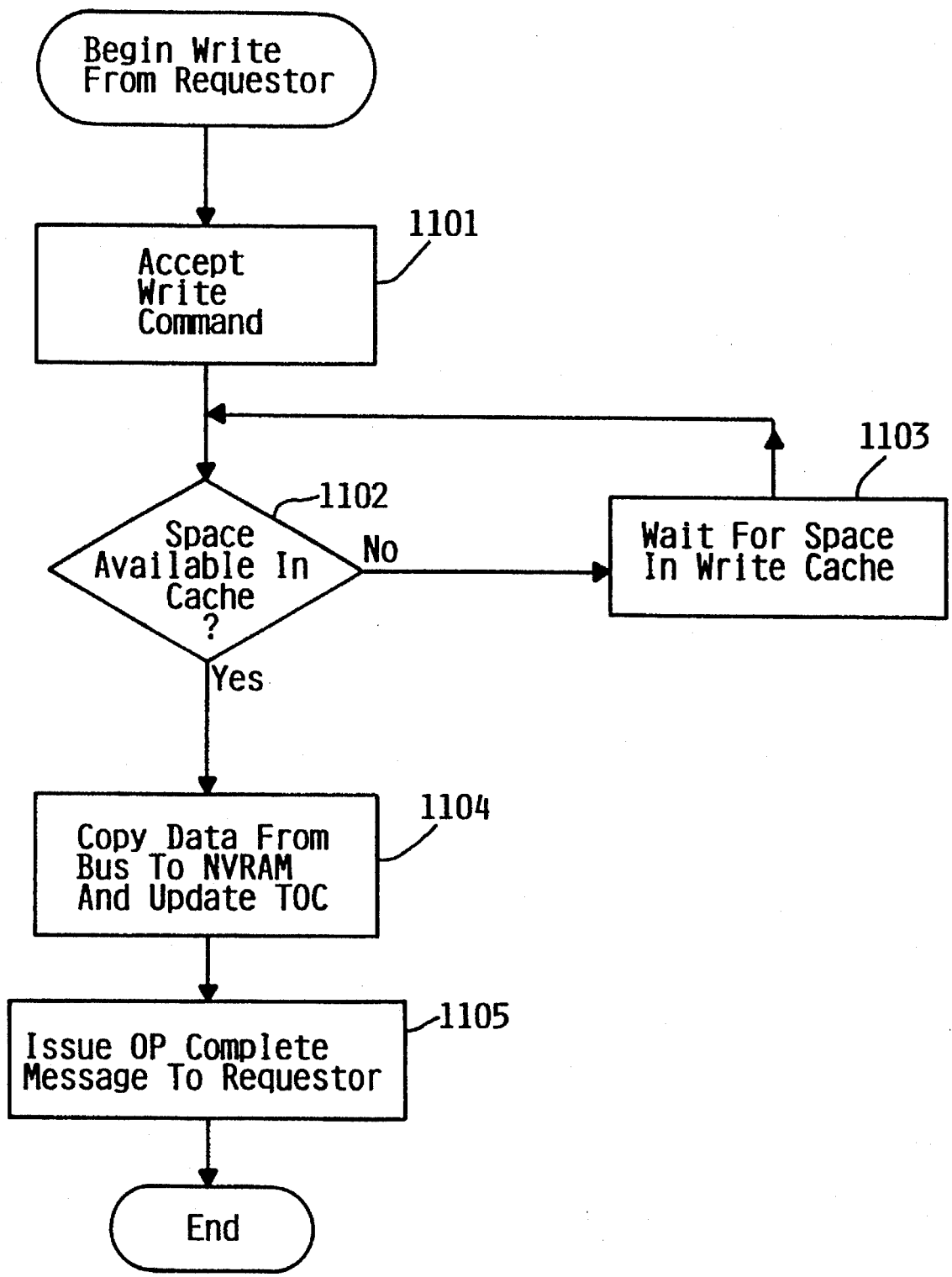
FIG. 11 is a flow diagram showing the steps required for the controller IOP to receive data to be written to the array, in accordance with the preferred embodiment.

A WRITE operation is performed by two asynchronous tasks of control program 221,222 running in microprocessor 201. One task communicates via bus 104 with the component of the system issuing the WRITE request (requestor), and is shown in FIG. 11. The WRITE operation begins when it accepts a WRITE command from the bus at step 1101. It then checks table of contents 225 to determine whether sufficient space is available in write cache 213 to store the data to be written to storage at step 1102. If space is not available, controller IOP 105 can not receive data from the host, and must wait for space to become available at step 1103 (i.e., it must wait for data already in write cache 213 to be written to one of the disk units 111–116). When space becomes available in write cache 213, data is received from bus 104 through interface 205 into write cache 213, and table of contents 225 is updated at step 1104. Microprocessor 201 then issues an operation complete message to the requestor at step 1105 on bus 104. Upon receipt of the operation complete message, the requester (e.g. system CPU 101) is free to continue processing as if the data were actually written to one or more of disk units 111–116, although in fact the data may wait awhile in write cache 213. From the requestor's perspective, the operation will appear to be complete.

Figure 12:
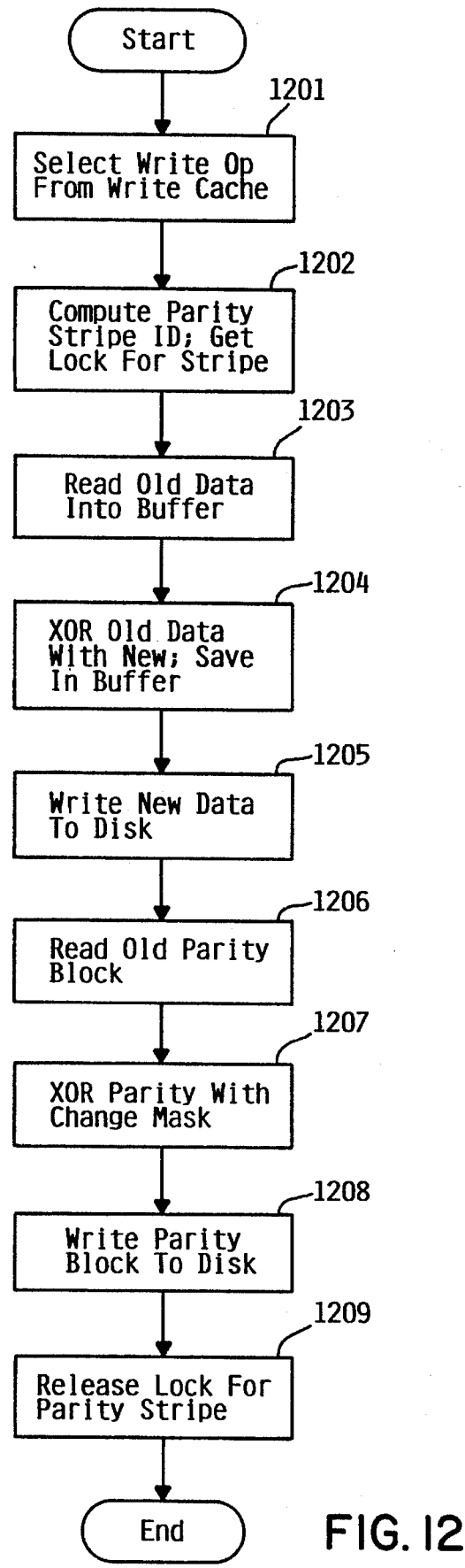
FIG. 12 is a flow diagram showing the steps required for the controller IOP to write data to the array and update parity, in accordance with the preferred embodiment.

The second asynchronous task running in microprocessor 201 writes data from write cache 213 to one or more disk drive units. A flow diagram of this task in normal operating mode is shown in FIG. 12. It selects a WRITE operation from among those queued in write cache 213 at step 1201. The selection criteria are not a part of this invention, and could be, e.g., FIFO, LIFO, or some other criteria based on system performance and other considerations. IOP 105 then determines the corresponding parity stripe identifier and location of the corresponding parity block in accordance with the formula for obtaining the parity stripe identifier from a data block explained previously, at step 1202. Upon computing the parity stripe identifier, IOP 105 obtains the appropriate lock on the parity stripe (recording the lock in lock table 226) to prevent any alteration of the data while the write and parity update is being performed.

When the WRITE operation is performed, parity must be updated. By taking the exclusive-OR of the new write data with the old data, it is possible to obtain a bit map of those bits being changed by the WRITE operation, referred to as a "change mask". Exclusive-ORing this change mask with the existing parity data will produce the updated parity data. Therefore, before writing to storage, the old data must first be read into buffer 212 from the disk unit at step 1203. This old data in the buffer is then exclusive-ORed with the data to be written in write cache 213, using exclusive-OR hardware 204, to produce the change mask of changed data at step 1204. The change mask is saved temporarily in buffer 212 while the new data is written to one of the storage devices 111–116 at step 1205. The corresponding old parity record is then read into buffer 212 at steps 1206, and exclusive-ORed with the change mask to produce the new parity data at step 1207. This new parity data is then written to the appropriate one of disk units 111–116 and table of contents 225 is updated to indicate that the data no longer resides in cache, at step 1208. The lock on the parity stripe in lock table 226 is then released at step 1209, completing the WRITE operation.

From the perspective of array IOP 105, each disk storage unit 111–116 is a self-contained unit which is either functioning properly or is not. The disk device itself may contain internal diagnostic and error recovery mechanisms which enable it to overcome certain types of internal defects. Such mechanisms are beyond the scope of the present invention. As used herein, the failure of a disk storage unit means failure to function, i.e., to access data. Such a failure may be, but is not necessarily, caused by a breakdown of the unit itself. For example, the unit could be powered off, or a data cable may be disconnected. From the perspective of the controller, any such failure, whatever the cause, is a failure of the storage unit. Detection mechanisms which detect such failures are known in the art.

In the event of failure of one of disk units 111–116, controller IOP 105 can reconstruct data stored on the failing unit. In the preferred embodiment, the failing unit must first be repaired or replaced with another unit. The replacement unit is given the same device number as the failing unit, and reconstructed data is placed on the replacement unit. In the alternative, it would be possible to maintain one or more "hot spare" disk drive units coupled to IOP 105, which could automatically be allocated to replace the failing unit without requiring intervention by an operator. Whether a "hot spare" unit is automatically brought on line or a replacement unit is manually connected to controller 105, reconstruction of data is performed as described below.

Figure 13:
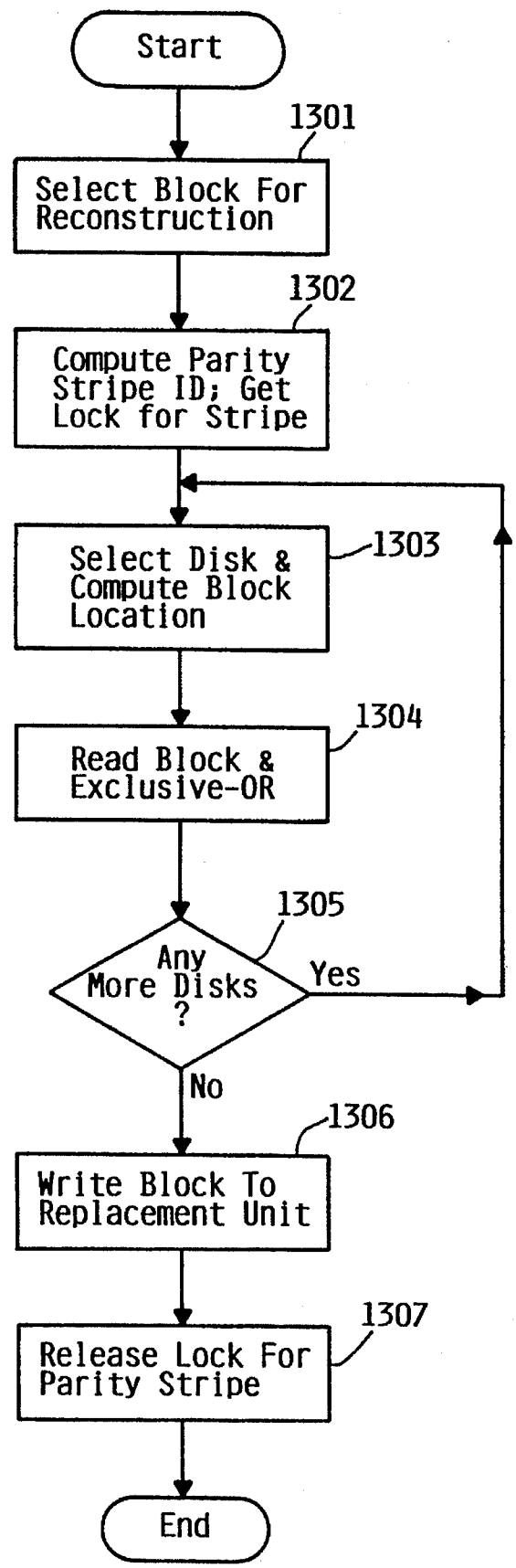
FIG. 13 shows the steps required to reconstruct data contained in a failing unit in accordance with the preferred embodiment.

FIG. 13 shows the steps required to reconstruct data contained in a failing unit. Data is reconstructed one block at a time. At step 1301, an unreconstructed block on the replacement unit is selected for reconstruction. Controller IOP 105 then computes the parity stripe identifier for the unreconstructed block at step 1302, using the formula described above for determining parity stripe identifier from block location. Upon computing the parity stripe identifier, IOP 105 obtains the corresponding lock on behalf of the data reconstruction task to prevent another task from interfering with the data (e.g. writing to one of the disks) while it is being reconstructed. IOP 105 then successively selects each non-failing disk unit in turn and determines the location of the one block on that unit (parity or data block) belonging to the parity stripe being reconstructed at step 1303, using the formula described above for determining block location from parity stripe identifier. At step 1304, the block is read and exclusive-ORed with the successive exclusive-OR of previous blocks (in the case of the first block being read, no exclusive-OR is performed). The results are stored temporarily in buffer 212. If more disks remain in the array (step 1305), the next disk is selected at step 1303 and the process iterates. Although the process is depicted as iterative in FIG. 13 at blocks 1303–1305, in fact IOP 105 sends requests to the disk units to read the respective data blocks concurrently, so that it is not necessary to wait until each successive disk unit has read its data block before the next disk unit is requested to read a block. When all blocks have been read and exclusive-ORed as described, the resulting block in buffer 212 represents the reconstructed data, and it is written to the replacement disk unit at step 1306. After writing the data to the replacement unit, the lock is released at step 1307.

Once a replacement is available for a failed disk unit, data may be either reconstructed dynamically (i.e., while system 100 is running, as requests are made to access the data) or by suspending normal operation of system 100 and reconstructing data all at once. In the preferred embodiment, data is reconstructed dynamically by controller IOP 105, using essentially the same procedure described in commonly assigned copending U.S. patent application Ser. No. 07/975,156 to Bond et al., filed Nov. 12, 1992, which is a file wrapper continuation of U.S. patent application Ser. No. 07/542,216, filed Jun. 21, 1990 (now abandoned), entitled "Method and Apparatus for Recovering Parity Protected Data", which is herein incorporated by reference.

In the event of failure of a disk unit, IOP 105 will continue to access data, allowing system 100 to continue operation, before a replacement unit is available for the failed disk unit. However, in doing so it is running in "exposed mode", i.e., the data is no longer redundant, so that a second disk unit failure will result in loss of data. For this reason it is advisable to replace the failed disk unit as soon as possible. When running in exposed mode, IOP 105 will access data on a non-failing unit in the normal manner (if the parity block for the data being written is on the failing unit, parity is simply ignored). When reading data on a failing unit, IOP 105 uses the data reconstruction procedure described above and shown in FIG. 13, except that instead of writing the reconstructed data to the replacement unit at step 1306, the data is transferred to the requestor on bus 104.

Figure 14:
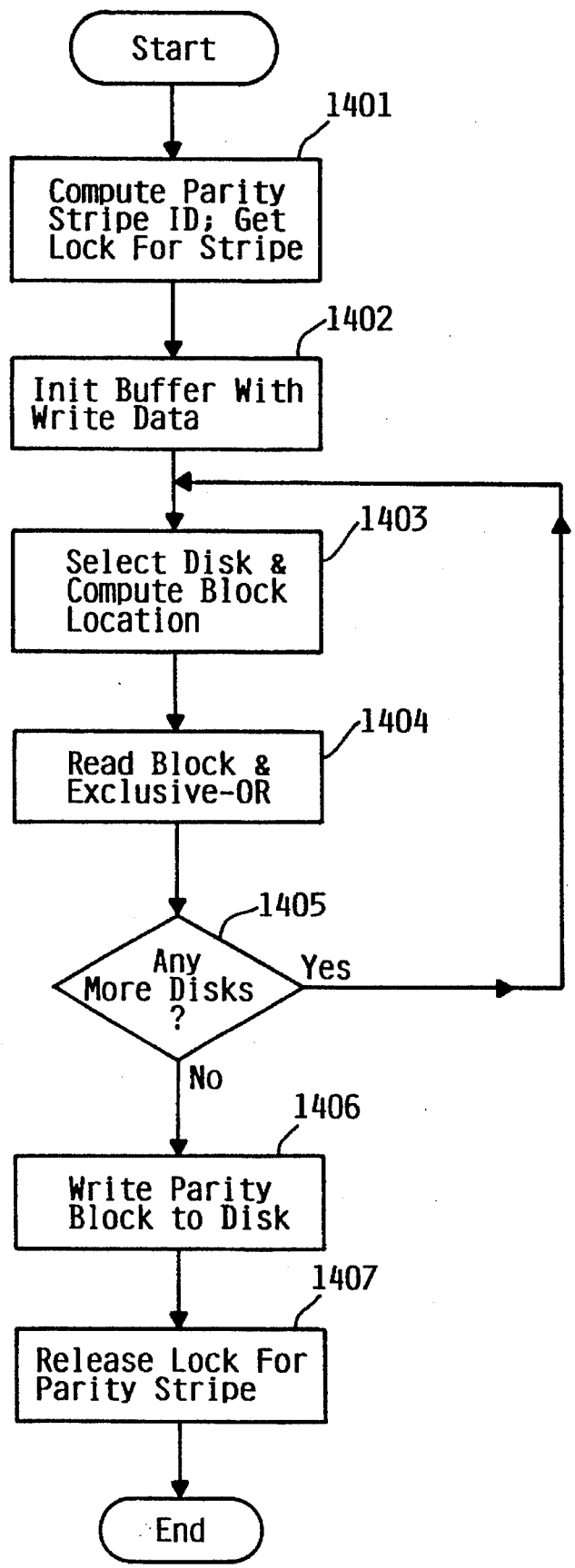
FIG. 14 shows the steps required to perform a write operation in exposed mode, in accordance with the preferred embodiment.

When writing data to a failed unit, all data blocks in the parity stripe must be read so that the parity block can be updated. This process is shown in FIG. 14. At step 1401, IOP 105 computes the parity stripe identifier of the data block to be written, using the formula described above for determining parity stripe identifier from block location. IOP 105 obtains the corresponding lock on behalf of the write task to prevent another task from interfering with the parity stripe while the parity is being reconstructed. At step 1402, an area of buffer 212 for holding successive exclusive-OR results is initialized with the new data to be written to the data block on the failed disk unit. IOP 105 then successively selects each non-failing disk unit in turn (other than the disk unit storing parity) and determines the location of the data block on that unit belonging to the same parity stripe as the block being written at step 1403, using the formula described above for determining block location from parity stripe identifier. At step 1404, the block is read and exclusive-ORed with the successive exclusive-OR of previous blocks, and the results stored temporarily in buffer 212. If more disks remain in the array (step 1405), the next disk is selected at step 1403 and the process iterates. As in the case of data reconstruction shown in FIG. 13, steps 1403–1405 are in fact performed concurrently. When all data blocks have been read and exclusive-ORed as described, the resulting block in buffer 212 represents parity, and it is written to the corresponding parity disk unit at step 1406. After writing the parity block, the lock is released at step 1407.

IOP 105 of the preferred embodiment is housed with the system CPU and bus, and preferably has back-up short term emergency power. In the event of power loss, IOP 105 will complete any partially completed write operations to avoid a situation where the new data has been written to disk but the new parity has not. In this case, the change mask will be lost (it is stored in volatile buffer 212). If all disks were operating in normal mode, the parity can be reconstructed by reading all the data and successive exclusive-ORing; however, if the system is running in exposed mode and is powered down, loss of the change mask could result in lost data. It would alternatively be possible to store the change mask in non-volatile write cache 213 so that a write operation could be completed later even if interrupted.

Although in the preferred embodiment the array operates "exposed" until a disk unit is replaced, it would alternatively be possible to automatically connect the controller to a "hot spare" to immediately begin data reconstruction. It would also be possible to shut down the array to prevent further access and possible data loss should a second unit fail. Additionally, it would be possible to store reconstructed data in the parity blocks or in spare storage areas of the existing disk drive units, as described in commonly assigned copending U.S. patent application Ser. No. 07/975,156 to Bond et al.

In the preferred embodiment described above, parity blocks are located on rows of the address matrix, while data blocks of a parity stripe are located along diagonals. It will be noted that although the parity stripe is "shifted" in the preferred implementation at certain rows, this is to avoid writing the data block on the same disk drive unit as the parity block. In other words, if the disk drive unit containing the parity block is removed from the matrix, then all the data blocks of a stripe lie on a diagonal according to the preferred embodiment. However, it should be understood that other arrangements of the data blocks are possible within the scope of the present invention. Data blocks of a stripe must be located on different disk units to achieve data redundancy, and are preferably located at different addresses within each disk unit to avoid problems with locality of reference. The essential point of the present invention is to locate parity blocks within a confined address range, i.e. a limited number of rows. The number of parity rows (rows containing at least some parity blocks) is less than the number of rows containing no parity blocks (only data blocks), and preferably should not be more than ¼ of the total number of rows in the array. More specifically, the number of rows containing parity is preferably R/N (rounded up to the nearest integer), where R is the total number of rows in the matrix (total number of blocks available on any one disk unit), and N is the number of disk units on which parity blocks are distributed. In some implementations, parity blocks will be distributed on all the disk units of the array; in others, parity blocks will be confined to some subset of the disk units for the reasons explained above. Where parity blocks are distributed on all the disk units of the array, the rows containing parity blocks will generally contain parity blocks only. It should be further understood that the rows containing parity blocks need not be contiguous. Particularly, it may be desirable in some applications to locate parity rows in a plurality of bands, with rows containing only data blocks located between the bands of parity rows.

In the description above, a single disk array driven by array IOP 105 has been described for ease of understanding. However, array IOP 105 is preferably capable of supporting multiple arrays, i.e., multiple sets of disk storage devices which independently containing their own parity blocks. Where multiple arrays are used, it is theoretically possible for one storage unit in each array to fail, without loss of data. Array IOP 105 of the preferred embodiment is capable of supporting one or two separate arrays collectively having a total of up to sixteen disk units. The handling of multiple arrays requires that array IOP 105 maintain state and configuration information identifying which disk units belong to which array. While the array IOP of the preferred embodiment is capable of handling a specific number of devices and a specific number of arrays, it should be understood that the number of devices and separate arrays could be varied within the scope of the present invention. It should also be understood that the number of IOPs 105 attached to system bus 104 is variable, and that more than one IOP, each servicing one or more arrays, could be attached to the system.

In the preferred embodiment, a single array controller IOP services a plurality of disk drives in a storage subsystem. The disk drives themselves are redundant, enabling the subsystem to continue operation in the event of failure of a single drive, but the controller is not. Alternatively, it would be possible to operate the storage subsystem with multiple redundant controllers, enabling the system to remain operational in the event of failure of any single controller IOP. For example, assuming proper physical connections exist, it would be possible to operate a subsystem having controllers A and B, in which controller A services disk drives 1 to N, and B services disk drives (N+1) to 2N. In the event of failure of any one controller, the other would service all disk drives 1 to 2N. In this case, the subsystem would continue to operate despite the failure of a single controller, although its performance may be degraded.

In the preferred embodiment, the array controller is an I/O processor directly attached to the system bus. This means that in physical construction, controller IOP 105 is housed within the same enclosure and receives power from the same source as the system bus and other IOPs. The disk units are also housed within the same enclosure, although they could alternatively be connected by remote cables. In another alternative, it would also be possible to house the controller and disk units together as a modular "subsystem", connected to the main system by a remote cable. It would also be possible to perform functions performed by the array controller in the system CPU or some other unit, or to distribute the functions of the array controller among several different components such as the system CPU, IOPs, remote controllers, or the disk units themselves.

In the preferred embodiment, all storage units have the same storage capacity. This simplifies the control mechanism and facilitates substitution of one unit for another. However, it would alternatively be possible to practice the present invention to units of varying capacities. In particular, the disk units on which parity blocks are stored might be of different size from the disk units having only data blocks.

In the preferred embodiment, parity blocks are located in the high address region of the disk units, corresponding to the inner diameter regions of the disk surfaces. This is done in order to simplify address translation and to simplify the process of adding disks to an existing array of disks. However, other regions of the address range could be chosen. In particular, it may be desirable in some applications to locate the parity blocks in address regions corresponding to the middle of the disk surfaces. The time required to access data stored on a disk includes the seek time, i.e. the time needed for the read/write actuator to move from its current position to the location of the data to be accessed. The shorter this distance, the quicker the access. On the average, the actuator must travel a shorter distance (and hence will seek faster) when accessing data in the middle annular region of the disk rather than at the inner annular region or the outer annular region. If parity blocks are accessed more frequently than data blocks, locating the parity blocks in the middle region may improve performance.

In the preferred embodiment, the storage units are rotating magnetic disk drive storage units. Such units are standard in the industry at the present time. However, it would be possible to operate a storage subsystem according to the present invention having storage units employing a different technology. For example, optical disk storage units may be employed.

Although a specific embodiment of the invention has been disclosed along with certain alternatives, it will be recognized by those skilled in the art that additional variations in form and detail may be made within the scope of the following claims.

What is claimed is:

1. A storage subsystem for a computer system, comprising:

storage subsystem controller, said controller having a processor and a memory;

a plurality of data storage units coupled to sad controller, a first group of at least three data storage units coupled to said controller, wherein addressable storage space in said plurality of data storage units corresponds to a two-dimensional array of storage blocks, each column of said array representing a different one of said data storage units, and each row of said array representing a discrete range of storage locations within each storage unit;

means for computing parity blocks from data stored in data storage blocks, wherein each parity block is computed from data stored in a corresponding set of data storage blocks, each said data storage block of said set being located on a different one of said data storage units;

means for storing said parity blocks on one or more parity rows in said first group of at least three data storage units of said array, said parity rows being fewer than half of all the rows of said array, each of said parity rows comprising a plurality of storage blocks containing parity blocks, wherein each parity block is stored on a storage unit different from any of the storage units containing storage blocks of the set of storage blocks corresponding to said parity block and;

a second group of at least one data storage unit, the storage blocks of said second group containing data, each storage block containing data in said second group being associated with a parity block in said first group of said at least three data storage units.

2. The storage subsystem of claim 1, wherein said parity rows are no more than one quarter of the total number of rows of said array.

3. The storage subsystem of claim 1, wherein said array contains R/N parity rows, R/N being rounded upward to the nearest integer value, where R is the total number of rows of said array and N is the number of said data storage units in said array which contain parity blocks, N being greater than one.

4. The storage subsystem of claim 3, wherein all data storage units in said array contain parity blocks, N being the total number of data storage units in said array.

5. The storage subsystem of claim 1, wherein said data storage blocks of each respective set are stored along a respective diagonal of said array.

6. The storage subsystem of claim 1, wherein said parity rows are located in the upper range of addresses of said first group of storage units.

7. The storage subsystem of claim 1, wherein said one or more parity rows represent storage locations which are selected to maximize performance of said storage subsystem.

8. A storage subsystem for a computer system, comprising:

storage subsystem controller, said controller having a processor and a memory;

at least three data storage units coupled to said controller, wherein addressable storage space in said data storage units corresponds to a two-dimensional array of storage blocks, each column of said array representing a different one of said data storage units, and each row of said array representing a discrete range of storage locations within each storage unit;

means for computing parity blocks from data stored in data storage blocks, wherein each parity block is computed from data stored in a corresponding set of data storage blocks, each said data storage block of said set being located on a different one of said data storage units; and means for storing said parity blocks on one or more parity rows of said array, said parity rows being fewer than half of all the rows of said array, each of said parity rows comprising a plurality of storage blocks containing parity blocks, wherein each parity block is stored on a storage unit different from any of the storage units containing storage blocks of the set of storage blocks corresponding to said parity block, wherein said storage units are rotating magnetic disk drive storage units, and wherein said one or more parity rows represent storage locations in a plurality of middle annular regions of respective disk surfaces of said rotating magnetic disk drive storage units.

9. A controller for a storage subsystem of a computer system, comprising:

a processor;

a memory;

a first interface for communicating with a processor of said computer system;

a second interface for communicating with a plurality of data storage units, wherein addressable storage space in said data storage units corresponds to a two-dimensional array of storage blocks, each column of said array representing a different one of said data storage units, and each row of said array representing a discrete range of storage locations within each storage unit;

means for computing parity blocks from data stored in data storage blocks, wherein each parity block is computed from data stored in a corresponding set of data storage blocks, each said data storage block of said set being located on a different one of said data storage units;

a first group of said plurality of data storage units, said first group having addressable storage blocks containing data and other addressable storage blocks storing parity information;

means for storing said parity blocks on one or more parity rows of said array, said parity rows being fewer than half of all the rows of said array, each of said parity rows comprising a plurality of storage blocks containing parity blocks, wherein each parity block is stored on a storage unit different from any of the storage units containing storage blocks of the set of storage blocks corresponding to said parity block and;

a second group of said plurality of data storage units, said second group storing data in said addressable storage blocks of said second group and being associated with addressable storage blocks of said first group that store parity information.

10. The controller for a storage subsystem of claim 9, wherein said parity rows are no more than one quarter of the total number of rows of said array.

11. The controller for a storage subsystem of claim 9, wherein said array contains R/N parity rows, R/N being rounded upward to the nearest integer value, where R is the total number of rows of said array and N is the number of said data storage units in said array which contain parity blocks, N being greater than one.

12. The controller for a storage subsystem of claim 9, wherein all data storage units in said array contain parity blocks, N being the total number of data storage units in said array.

13. The controller for a storage subsystem of claim 9, wherein said data storage blocks of each respective set are stored along a respective diagonal of said array.

14. A computer system, comprising:

a bus for communicating among components of said computer system;

at least one central processing unit communicating with said bus;

a system memory communicating with said bus;

a plurality of data storage units further including a first group of at least three data storage units communicating with said bus, and a second group of at least one data storage unit communicating with said bus;

wherein addressable storage space in said plurality of data storage units corresponds to a two-dimensional array of storage blocks, each column of said array representing a different one of said data storage units, and each row of said array representing a discrete range of storage locations within each storage unit;

means for computing parity blocks from data stored in data storage blocks, wherein each parity block is computed from data stored in a corresponding set of data storage blocks in a first group of at least three data storage units and in a second group of at least one data storage unit, each said data storage block of said set being located on a different one of said data storage units; and means for storing said parity blocks on one or more parity rows in said first group of at least three data storage units of said array, said parity rows being fewer than half of all the rows of said array, each of said parity rows comprising a plurality of storage blocks containing parity blocks, wherein each parity block is stored on a storage unit different from any of the storage units containing storage blocks of the set of storage blocks corresponding to said parity block.

15. The computer system of claim 14, wherein said parity rows are no more than one quarter of the total number of rows of said array.

16. The computer system of claim 14, wherein said array contains R/N parity rows, R/N being rounded upward to the nearest integer value, where R is the total number of rows of said array and N is the number of said data storage units in said array which contain parity blocks, N being greater than one.

17. The computer system of claim 14, wherein said data storage blocks of each respective stripe are stored along a respective diagonal of said array.

18. A method for operating a redundant array of a plurality of data storage units, said plurality of data storage units in a first group of at least three data storage units of a data storage system and in a second group of at least one data storage unit of a data storage system, wherein addressable storage space in said data storage units corresponds to a two-dimensional array of storage blocks, each column of said array representing a different one of said data storage units, and each row of said array representing a discrete range of storage locations within each storage unit, said method comprising the machine implemented steps of:

identifying data to be written to a first data block of said array of storage blocks;

identifying a parity block associated with said data block, said parity block representing a parity function of a set of data blocks, said first data block being a member of said set of data blocks, each of said data blocks of said set and said parity block being stored on a different one of said storage devices;

writing said data to be written to said first data block in said first group of data storage units;

updating said parity block to reflect said data written to said first data block;

writing said data to be written to said second data block in said second group of data storage units;

updating said parity block to reflect said data written to said second data block;

storing said parity block in one of a plurality of party rows of said first group of storage units of said array, each said parity row containing a plurality of parity blocks, said parity rows being fewer than half the total number of rows of said array.

19. The method for operating a redundant array of storage units of claim 18, wherein said array contains R/N parity rows, R/N being rounded upward to the nearest integer value, where R is the total number of rows of said array and N is the number of said data storage units in said array which contain parity blocks, N being greater than one.

20. The method for operating a redundant array of storage units of claim 19, wherein all data storage units in said array contain parity blocks, N being the total number of data storage units in said array.

21. The method for operating a redundant array of storage units of claim 18, wherein said data storage blocks of each respective set are stored along a respective diagonal of said array.

22. The method for operating a redundant array of storage units of claim 18, wherein said parity rows occupy a single contiguous band of addressable storage space of said first group of said array.

23. A storage subsystem for a computer system, comprising:

a storage subsystem controller, said controller having a processor and a memory;

a plurality of data storage units coupled to said controller including a first group of at least three data storage units coupled to said controller, and a second group of at least one data storage unit coupled to said controller, wherein addressable storage space in said plurality of data storage units corresponds to a two-dimensional array of storage blocks, each column of said array representing a different one of said data storage units, and each row of said array representing a discrete range of storage locations within each storage unit;

means for computing parity blocks from data stored in data storage blocks located in data rows of said array, each of said data rows containing a plurality of storage blocks containing data blocks, wherein each said data row contains no parity blocks, wherein each parity block is computed from data stored in a corresponding set of data storage blocks, each said data storage block of said set being located on a different one of said data storage units; and means for storing said parity blocks on one or more parity rows of said first group of said array, each of said parity rows comprising a plurality of storage blocks containing parity blocks, wherein each parity block is stored on a storage unit different from any of the storage units containing storage blocks of the set of storage blocks corresponding to said parity block, data blocks from said first and second group of data storage units being associated with at least one of said parity blocks in said first group.

24. The storage subsystem of claim 23, wherein said data storage blocks of each respective set are stored along a respective diagonal of said array.

* * * * *